United States Patent
Spring

(10) Patent No.: US 8,515,892 B2
(45) Date of Patent: Aug. 20, 2013

(54) ARTIFICIAL INTELLIGENCE SYSTEM

(75) Inventor: Leslie Spring, Granada Hills, CA (US)

(73) Assignee: Cognitive Code Corp., Martinsville, NJ (US)

(*) Notice: Subject to any disclaimer, the term of this patent is extended or adjusted under 35 U.S.C. 154(b) by 0 days.

(21) Appl. No.: 13/405,752

(22) Filed: Feb. 27, 2012

(65) Prior Publication Data

US 2012/0158634 A1  Jun. 21, 2012

Related U.S. Application Data

(63) Continuation of application No. 12/043,911, filed on Mar. 6, 2008, now Pat. No. 8,126,832.

(60) Provisional application No. 60/938,427, filed on May 16, 2007, provisional application No. 60/893,237, filed on Mar. 6, 2007.

(51) Int. Cl.
G06N 5/02 (2006.01)
G06F 17/20 (2006.01)
G06F 17/21 (2006.01)
G06F 17/27 (2006.01)
G06F 17/30 (2006.01)

(52) U.S. Cl.
USPC ................ 706/46; 706/55; 707/778

(58) Field of Classification Search
USPC .......................................... 706/46
See application file for complete search history.

(56) References Cited

U.S. PATENT DOCUMENTS 7,366,730 B2 * 4/2008 Greenfield et al. ............ 1/1

* cited by examiner

*Primary Examiner* — Jeffrey A Gaffin
*Assistant Examiner* — Nathan Brown, Jr.
(74) *Attorney, Agent, or Firm* — Dentons US LLP

(57) ABSTRACT

An artificial intelligence system and method for interpreting input from a user and generating a response to the user. The input is converted into an array of concepts which are compared to a database of interrelated concepts. A response is generated based on the concepts in the database and their relationship to the concepts in the input array. The system and method may be implemented in a number of electronic or computer devices to interact with humans or computer systems.

26 Claims, 10 Drawing Sheets

SILVIA - edit atoms

Concept#284 of 10471 ☐ BOUND Weight (←) dog (→) 0.33

(CLEAN!) (BALANCE!) ☑ TOPIC

| BOUND ATOM | BINDING TYPE | |
|---|---|---|
| canine | synonym | ▲▼ |
| doggy | synonym | ▲▼ |
| dogs | plural | ▲▼ |
| bulldog | child | ▲▼ |
| german-shepard | child | ▲▼ |
| chihuahua | child | ▲▼ |
| pet | parent | ▲▼ |
| | | ▲▼ |

ARTIFICIAL INTELLIGENCE SYSTEM

CROSS-REFERENCE TO RELATED APPLICATIONS

The present application is a Continuation of U.S. Nonprovisional application Ser. No. 12/043,911 filed 6 Mar. 2008, which claims the benefit of U.S. Provisional Application Ser. No. 60/938,427 filed on 16 May 2007 and U.S. Provisional Application Ser. No. 60/893,237 filed on 6 Mar. 2007, all of which incorporated herein by reference in their entireties.

BACKGROUND OF THE INVENTION

The present invention relates to artificial intelligence systems.

Systems claiming to simulate artificial intelligence are known in the art. These systems are usually adapted to receive input from a user, in either speech or typed form, and output a pre-prepared response when a certain word or phrase is detected in the input. These systems fail to take into account different phrasings, terminology, sentence structure, syntax, and speech patterns. This limits the ability of such systems to properly respond to user input. These systems do not create association between words or correlate words and phrases. Because these systems do not understand the input in a contextual basis, they fail to provide an intelligent or useful response and/or fail to take actions desired by a user.

Artificial intelligence systems have been utilized in various different applications to interact with individuals. These applications have included customer service applications, voice response systems, games, and pure novelty pseudo-interactive programs. In efforts to reduce costs associated with customer service, many companies have implemented automated systems which interact with customers instead of allowing customers to speak with representatives immediately. Some systems allow users to complete entire transactions such as paying a utility bill over the phone without ever speaking to a representative. Many companies use automated systems to obtain preliminary information from customers in order to reduce the amount of time that the customer has to speak with a representative or in order to direct the customer to a representative in a certain area of expertise. Many existing automated customer service systems are directed to reducing the amount of time that a live representative must spend handling customer concerns.

Existing automated customer service systems are deficient in a number of ways and fail to meet the needs of companies that utilize them. The primary deficiency of existing systems is that they provide very few options to the user. For example, many systems provide the user with a list of options, but if the user needs service with respect to something that is not on the menu the system is unable to assist the user. The user must respond with specific words or phrases as opposed to a natural language response.

A second drawback of existing customer service systems is that they are extremely slow. If a menu of options is presented to a user as discussed above, the user must listen to all of the options until he or she hears the option that applies to him or her. This time is costly for the company that owns the system because the company typically pays the phone bill for the call. In addition, longer phone calls mean that fewer phone lines are open for additional customers to call. Many companies rate their customer service by call time and the quality of their customer service is often perceived by customers as higher quality if call length is minimized. Many users also choose to bypass these automated systems because of the inefficiencies of the system.

Another major drawback of existing automated customer service systems is that the customer often feels neglected and dissatisfied when forced to deal with the automated system instead of speaking to a live person if the automated system fails to meet their needs.

Another industry that utilizes automated systems is the telephone chat industry. Some of these systems are designed to give weather or sports information to callers or to engage the caller in an interactive story. A caller typically calls these numbers to request information such as weather forecasts or sports scores. Some of these system provide the caller with an opportunity to chat with a representative. Because these systems typically charge a fee to the caller based on the length of the call, it is advantageous for the administrator of the system to entertain the caller for as long as possible. Existing automated systems are useless in this arena because callers pay for the ability to have lively conversation with a live person. Providing individuals for the callers to interact with, however, is extremely expensive. A need exists for an artificial intelligence system that is able to interact with individuals intelligently and respond to the individuals with intelligent, responsive results.

There is also a need for artificial intelligence in computing, such as personal computing. An artificial intelligence system may be implemented in a computer environment which allows a user to navigate the various programs operable on a computer and perform functions on a computer without using a keyboard or mouse as input devices. Such a system would allow a user to simply speak various commands to a computer and have the computer execute actions in response to the user commands. The system may ask questions of the user to more accurately determine what the user wishes to accomplish and react to the user's answers. One example of such a system is an artificial intelligence system that responds to user requests for navigating the Internet, such as "Please open the New York Times page" and "Go to the sports section."

There is also a need for an advanced artificial intelligence system in portable electronics and computing. The rise in usage of portable electronic devices, such as cellular telephones, personal digital assistants, and digital cameras has led to the need for an improved user interface which will allow a user to quickly utilize the various features associated with each device. Users typically find the input devices such as keyboards and buttons on these devices difficult to manipulate.

An advanced artificial intelligence system is needed in a home environment for physically challenged individuals, particularly those with limited motor skills. Such a system would allow hands-free interaction with various devices and appliances commonly used by such individuals at home, such as the telephone, television, oven, and microwave Thus, a need exists for an intelligent system that can replace or supplement human beings with respect to a variety of tasks and activities.

SUMMARY OF THE INVENTION

The present invention is an artificial intelligence system. The present invention may simulate one or more thinking people and uses text and/or speech to interact with users. The present invention is a major advancement over existing pseudo-artificial intelligence systems because the present system does not operate merely based on words or sentences. The present invention extracts concepts from text and/or speech and utilizes numeric representations of concepts and their relationships. The extraction of concepts allows expression in various patterns to be understood by the system. The processes allow the system to bypass human language constraints in order to think in concepts. The present system may also dynamically construct output so that it can generate intelligent responses in a number of grammatically correct ways. Because the system utilizes numeric representations of concepts and their relationships, the system is language independent and may even function with a plurality of languages.

The present invention functions extremely quickly because natural language is reduced to numerical concepts before processing occurs. Once processing is complete, a numerical result is converted into natural language for output. In this system, much of the processing is independent of the natural language.

Because input text or language is converted into numerically represented concepts, syntax rules are for the most part not taken into account when input is analyzed. Input sentences with poor grammar or structure are analyzed in the same way as proper sentences because the concepts expressed in the input are analyzed.

In one embodiment, a device according to the present invention is a system for receiving input from a user and generating output to the user. The input is received in a first format. The input may then be translated into a second format such as, for example, an integer format. As part of a training mode, the system may have pre-stored in a database a collection of concepts represented by integers where each concept is assigned an integer. The input may be broken into tokens which are each assigned a corresponding integer. The input is stored in an input array, which is a one-dimensional linear array that contains one token for each integer or item of input.

In one embodiment, a system according to the present invention determines whether one or more tokens in the input array correlate to one or more predetermined criteria, such as for example, whether any one or more tokens in the array comprise a term of art or if two or more tokens in the array comprise a composite concept. In one embodiment, if any one or more tokens are found to comprise a term of art or if one or more tokens are found to comprise a composite concept, they may be replaced in the input array by a token representing the corresponding term of art or composite concept. In another embodiment, one or more tokens representing the term of art or composite concept may be added to the input array.

In one embodiment, a system according to the present invention determines whether one or more tokens in the input array correlate to any root token from which such token is or such tokens are derived. If a relationship is found between any token in the input array and any root token, the root token may be used in place of the token from the input array for which a relationship is found, for example, by converting or transforming it into the root token, replacing it with the root token or the root token may be added to the input array.

In one embodiment, the input array is expanded into a multi-dimensional array. The first step in constructing the multi-dimensional array is determining the root token, if available, for every token in the input array. If a root token exists for any token in the input array, the root token takes the place of the token in the input array. The input array is then expanded into a multi-dimensional array including all tokens that are related to the tokens in the input array or alternatively all tokens that may be derived from the root token.

For example, the multi-dimensional array may be constructed having a number of linear arrays with the number of linear arrays determined by the number of tokens in the root token array and the number of tokens corresponding to each root token. The formula for calculating the number of linear arrays is as follows: $(X_1+1)(X_2+1)(X_3+1)\ldots(X_n+1)$ where n is the number of root tokens and X is the number of tokens corresponding to the root token.

In one embodiment, the system stores a weight value for each concept. The weight value for each concept is then correlated with or assigned to a token in the input array for example, when the integer value for the token is assigned or thereafter. The weight may be used to signify the importance of the various elements in the array, such as, for example, the linear array or multi-dimensional arrays. In one embodiment, the various elements in the linear array are assigned a weight based on how frequently the elements appear in the various databases attached to the system, which will be discussed further herein. There may be a minimum value involved; for example if the various databases attached to the system contain only twenty sentences or statements, they may not be used for weighting because they will fail to provide an accurate portrayal of the importance of the term. In one embodiment, the weight of each element may be modified based on the part of speech of the element. The weight of an element may also be modified based on how many concepts are related to that particular element or based on a predetermined factor or setting. In another embodiment, the system will access a database such as an external database to obtain weight information. The weighting may also be overridden by the system based on certain predetermined criteria or by a user.

In one embodiment, a concept will have a plurality of weight values. For example, the concept may have a weight value based on how many hits appear for that concept in an Internet search engine and a separate weight value based on the number of relationships to other concepts the concept has. The concept may have a separate weight based on which part of speech the concept represents. These weights may be averaged to produce a single weight for a concept. In one embodiment, each token is assigned a normalized weight based on a percentage of that token's weight as a function of the maximum possible weight for any given token.

The system may include a table of common concepts that are assigned predetermined weights without searching any databases or external sources. These common concepts include words such as "the," "an," and "a" and may be assigned a low weight.

When a new concept is created and added to the database, the weight of the concept may be calculated in one of the manners described herein or it may be assigned a default weight by the system. The default weight may be the average weight of the other concepts stored in the system. In one embodiment, a user may manually assign a weight to a new concept.

In another embodiment, weight is assigned to a new concept based on the context in which the new concept is received. The weight may be the average of the concepts surrounding the new concept.

The weights assigned to concepts in the database may be created in any of the methods described when a concept is first added to the database. Alternatively, the weights may be created when the concept is first added to the database and modified at periodic intervals, such as weekly, by the system. In another embodiment, the weights may be created upon the match of a concept with a token in the input array.

In one embodiment, after weights are assigned to tokens in the input array, elements with a weight below a predetermined threshold may be removed from the array or discarded. Alternatively, they may be ignored. An advantage of not discarding an element is in the event that there is a contextual override to the determined weighting. An advantage of discarding an element is that it reduces the complexity of the array and speeds up processing.

The concept database may have multiple concepts for a single word. This occurs for words that are spelled the same way but have different meanings, such as "bear" or "ball." When the system receives input containing one of these terms, multiple matching concepts are identified and the system examines the context in which the term is used to determine which concept to utilize. The system may look at the other terms in the input or at other input arrays that were received, either recently or from the user currently utilizing the system, and compare them to statements stored in memory or an external source to determine which concept to use. For example, if the user says, "I would like to go play some ball" the system will look at other statements and find that when the word "ball" appears in the same statement as the word "play" the concept for "ball" will be used meaning the toy to be played with and not the event to be attended. Alternatively, the system may determine the correct concept based on the subject matter or nature of one or more databases loaded into the system.

Different concepts in the concept database may be related to each other. For example, the concept "subway" may be related to the concept "train" because they represent similar ideas. The concept "dachshund" may be related to the concept "dog" because a dachshund is a type of dog. These relationships may be create by the user when a new concept is added to the system or they may be created by the system based on the context of the concept in stored databases or external sources. Relationships may also be obtained from a database such as a dictionary or thesaurus which are common on the Internet.

In one embodiment, the linear token array is expanded into a multi-dimensional token array based on the corresponding root token and expanded sets of arrays comprised of tokens derived from the root tokens. After the input array has been constructed and weights have been assigned to the tokens in the input array, the system according to the present invention compares the multi-dimensional array to a number of conceptual token arrays, for example, generated as part of the system training, which may be stored in a database. The comparison may be accomplished, for example, by regression analysis or some other statistical method or mathematical algorithm or method. The conceptual token arrays are input patterns which may be in sentence form. The conceptual token arrays are preferably stored in the same format as the linear input arrays such as, for example, integer format, to expedite comparison. The system then generates a value for each conceptual token array such as, for example, a probability value of a likely match based on the similarity between the conceptual token array and the multi-dimensional array. The values may be normalized for ease of comparison. The weights of the tokens in the multi-dimensional array may also be considered, for example, so that a higher value for a conceptual token array is generated if it matches the tokens in the multi-dimensional array with the highest weights. After the system has compared the multi-dimensional array to all of the conceptual token arrays stored in memory, the system generates a list of conceptual token arrays that have the highest value, and thus are the closest matches and are the most similar to the input array.

In one embodiment, the conceptual token arrays are sentences or statements that are added to the system before the input is received such as, for example, as part of a training process.

In one embodiment, a system according to the present invention determines whether one or more tokens in the conceptual token array correlate to one or more predetermined criteria, such as for example, whether any two or more tokens in the conceptual token array comprise a composite concept. In one embodiment, if any two or more tokens are found to comprise a composite concept, they are replaced in the conceptual token array by a token representing the composite concept. In another embodiment, one or more tokens representing the composite concept may be added to the conceptual token array.

In one embodiment, each conceptual token array may be assigned a value such as, for example, the probability of a likely match based on its similarity to the input array after a comparison of the two, but the value may be incremented or decremented based on criteria such as, for example, context, prior input, active database or some other factor. In another embodiment, the value is a percentage based on the number of elements in the conceptual token array that match the elements in the input array. The conceptual token arrays that are analyzed may include both input patterns, for example those used to analyze an input token array, and output conceptual token arrays, for example, those used to construct a system output.

Once the system has the list of conceptual token arrays that have the highest value and thus most closely match the input array, the system may select the conceptual token array with the highest value to represent the input. Alternatively, the system may examine past exchanges between the system and the user to determine the best conceptual token array to use based on the context of the past exchanges.

When the system has identified the conceptual token array that is the best match for the multi-dimensional array, the system can begin constructing an output. In one embodiment, the output construction begins by searching the input array for one or more tokens with a weight above a predetermined threshold. If such tokens exist, those tokens are tagged as "essential." The system will search a collection of output patterns for the essential tokens. The system then searches first for a match to a first essential token and its corresponding root tokens. The search can be accomplished for example, using statistical algorithms such as regression analysis, Hidden Markov Models, genetic algorithms and modifications thereto. The system generates a multi-dimensional array based on the essential tokens, the root tokens from which the essential tokens are derived and tokens derived from the root tokens. For example, a modification to a Hidden Markov Model can be used where the algorithm is restarted for each essential token after a selection of output patterns has been achieved. If one or more output patterns having the essential token are identified, these output patterns are compared to the conceptual token array which represents the input array. The system will generate a value based on the similarity between the conceptual token array and the output patterns. If the value representing the similarity between the conceptual token array and the output pattern is above a predetermined threshold, that output pattern is chosen as a possible output to the user.

When the system has determined that there is no essential token, the system will search the output patterns stored by the system for an output pattern that closely resembles the conceptual token array that represents the input array. The output pattern that most closely resembles the conceptual token array is chosen for output. In some embodiments, each conceptual token array has one or more corresponding output patterns which obviates the need for this search.

The output patterns may be collections of tokens with assigned integers and weights which facilitates easy comparison with the conceptual token arrays. In some embodiments, the output patterns are complete statements that may be output to the user in their entirety. The output statements may also represent or enable actions to be taken by the system or a combination of an output and one or more actions.

In some embodiments, the output patterns are simply one or two tokens or words. When one of these output patterns is selected as output, the system will dynamically construct an output starting with the output pattern and resulting in a complete, grammatically correct, sentence. The dynamic output construction process may utilize one or more algorithms such as, for example, a Hidden Markov Model, a variation of a Hidden Markov Model, or another algorithm, to analyze the starting word or phrase, which may be an output pattern, and append words to the beginning and/or end of the starting word or phrase based on an analysis of a database of stored sentences. After each word is appended, the entire phrase is used in the next step of the analysis. Concepts are added, one at a time, in a grammatically correct fashion to the beginning and end of the phrase until a stop condition is reached in both directions. A stop condition is reached when the system determines that it has reached the likely beginning or ending of the output phrase based on the database of stored sentences.

When an output array has been prepared through dynamic construction, a suitability check is initiated. The suitability check may be performed based on various factors, including, for example, based on the number of essential concepts that are included in the output array and/or based on the order of such essential concepts in the output array. This suitability check is rerun for each output array resulting from each pass through the output construction algorithm. This looping through the output construction algorithm and suitability check will result in the best match being selected for the output array. To the extent that a better match is identified as a result of the run through the output construction algorithm and suitability check, such output array will supplant the prior selected output array as the final output. Upon completion of the final run through the output construction algorithm and suitability check, the final selection of the output array will be determined.

When a output pattern or a dynamically constructed statement is selected for output, it may be compared to stored output patterns, stored conceptual token arrays, or statements in external databases to determine whether it is properly constructed. This ensures that it is grammatically correct. If the comparison shows that there are no statements with a similar construction, the statement will be discarded and another output pattern or dynamically constructed statement will be selected for output.

In one embodiment, the selected or constructed output is in the form of a linear output array. The linear output array consists of the tokens, or words, to be output to the user. Before the output array is actually sent to the user, the output array may then be expanded into a multi-dimensional array based on the tokens contained in the linear output array in the same fashion as the input linear token array is expanded: related root tokens and tokens derived from the root tokens may be added to the array. The array may then be reduced back to a linear output array for output to the user with some or all of the tokens being replaced by tokens from the multi-dimensional array. The tokens are selected from the multi-dimensional array based on the weights of the elements in the multi-dimensional array, the likelihood of a particular token being used in the same sentence of the other tokens in the array, or the previous usage of the tokens in current or prior interactions with the user. The tokens may also be selected from the multi-dimensional array on a random basis in order to ensure that the output has a certain level of variation from the input. In this way, a different expression of a concept may be added to the output.

In one embodiment, the system determines whether one or more tokens in the output array correlate to one or more predetermined criteria, such as for example, whether any one or more tokens in the array comprise a term of art or if two or more tokens in the array comprise a composite concept, in the same way that composite concepts are found and replaced in the input array as described above.

In one embodiment, the present system may utilize variables in the output. The variables may be, for example, a result of input received by the system. In one example, if the system receives as input, "My name is Leslie," the system will store the term "Leslie" under a variable, such as "_name." The system may then use this variable when constructing output in the future, such as saying, "Here is the information you requested, Leslie." Variables may be embedded in output patterns, and output patterns having variables which contain a stored value may be given a higher weight than output patterns without variables.

In another embodiment, variables may be a result of processes performed by the system. For example, if a user asks the system a question, the system may perform real-time calculations to output a variable which responds to the user's inquiry.

The output patterns may also contain actions to be taken by the system, such as, for example, the execution of programming steps on a computer system.

Once an output array has been constructed or selected, it is converted from integer format into a natural language output. The natural language output may be output to the user in a number of formats, such as, for example, text, speech, or other methods. The output is preferably also stored in a log file which is accessible by the system. The log file may be used by the administrator of the system to review the system's functionality.

In one embodiment, when the multi-dimensional array is constructed, a first comparison between the multi-dimensional array and the output patterns is conducted which tags each output pattern with a tag showing whether that particular output pattern may be invoked further in the process or whether that output pattern will not be considered further. This first comparison is a method of efficiently eliminating output patterns that are completely unrelated to the multi-dimensional array and thus have no possible role to play in further processes. A second comparison may then be run which will store the output patterns with the highest probability of matching the multi-dimensional array in a table so that they may be further evaluated.

In one embodiment, the context of the different elements in the multi-dimensional array are considered when determining the probability that one or more of the output patterns will be used to formulate a response to the multi-dimensional array. Once an output pattern is selected, the context of the elements in that output pattern may be compared to the multi-dimensional array to determine whether the context is proper.

In one embodiment, a system according to the present invention may simulate a constant stream of thought. To accomplish this simulation, the system starts with an input, which may be the last output constructed or selected by the system or an output pattern selected at random. The input is broken into tokens, each of which is assigned a corresponding integer, as described above. The output pattern is typically stored in token format, but may be converted to token format if it is not already in token format. The tokens may be annotated to provide additional information to the system, such as which user the tokens came from or whether the tokens were obtained randomly from the system. The tokens are then used as input into the artificial intelligence system as if they were input from a user. Recent inputs and outputs to the system may also be considered by the system in constructing or selecting an output in order to provide output to a user that conforms to recent exchanges, with more weight being assigned to more recent exchanges. Analysis of recent inputs and outputs may also be used to eliminate redundancies in output to the user. In this embodiment, the system will produce an output as described above without any additional input. The output may be generated at periodic intervals, such as every one minute that elapses without an input from the user. The system may also generate output periodically but determine whether to actually output it to the user only if the output tokens have a weight above a predetermined threshold.

In a further embodiment wherein the system simulates a constant stream of thought as discussed above, an input may be constructed from a recent series of inputs and outputs. The input may be simply a collection of the concepts from the recent inputs and outputs with the highest weights. Once the input is constructed, it is entered into the system as if it were received from a user and an output is constructed according to the system as described above.

In one embodiment, the invention may be used with an interactive phone system that serves as a storytelling adventure. In this embodiment, the user calls the system and the system tells a story to the user. At different junctures in the story, the system may ask the user to make decisions concerning the adventure. The system will create the story according to the user's feedback to the system. Certain responses of the system will only be available when a user says something specific to the system. The system may allow the user to make decisions for the main characters in the story or determine what type of story is told.

In another embodiment, the invention may be used as an interactive teacher. The program may instruct a user on a particular topic and also respond to inquiries of the user. The program may also provide interactive examinations of the user.

The present system would also be useful as an interactive toy. In one embodiment, the system could by used in a talking teddy bear that listens to children and responds to comments by the children. In another embodiment, the invention could be used as an interactive educational toy that teaches children.

A system according to the present invention may also be used in a computer-based game. The game may allow the user to make choices for a game character by simply reciting instructions to the system. The system may react to user comments and adapt a game to any particular user.

In another embodiment, the invention is used as a customer service interface which is able to interact with customers and assist them in their needs. This may be a phone-based system in which customers describe their inquiries or requests to the system over the phone or an on-site system such as a restaurant where a user describes what kind of food the user is interested in purchasing. The system is able to understand a wide variety of expressions, decipher the message that the customer is attempting to send, and respond to the message. The response may be simply taking a customer's order or answering a customer's questions about the menu.

In one embodiment, different instances of the system may be trained on separate computers by separate individuals in order to add as much information to the system's databases as possible. The various databases of the different systems may then be merged into a single database in order to allow the system to contain a large amount of data and be able to respond to more input in more intelligent ways. Databases to be used with the system may be saved, transferred, or merged.

In one embodiment, a system according to the present invention may be implemented in a computer environment to allow a user to navigate the various programs operable on a computer and perform functions on a computer without using a keyboard or mouse as input devices. Such a system would allow a user to simply speak various commands to a computer and have the computer execute actions in response to the user commands. The system may ask questions of the user to more accurately determine what the user wishes to accomplish and react to the user's answers.

In one embodiment, a system according to the present invention is an advanced artificial intelligence system adapted for use in portable electronics and computing. An artificial intelligence system in this environment would allow these devices to receive user input and react to the input by executing specific actions or providing additional options to the user. The system would also be able to respond to user queries, particularly queries concerning the functionality of the device. Using this system, the user would never have to utilize a keyboard or buttons on the device, a user may simply speak commands.

A system according to the present invention may also be an artificial intelligence system implemented in the context of a building management system, such as home management. The system may receive commands from a user and take action in response to these commands such as manipulating a building's heating, air conditioning, lighting, and alarm systems. Such a system would allow users to control and query various systems within the building in a hands-free manner without having to access a control panel or remote control. The system would also be able to intelligently respond to user inquiries concerning the building, such as what the current settings are or which devices in the house are currently being used.

In one embodiment, the a system according to present invention may be an artificial intelligence system that would interact with users in a personal customer service capacity. One implementation of such a system would be an informational computer system in a subway station or in a popular tourist area. Such a system would be able to understand input from a variety of users expressed in different ways and be able to respond intelligently to the users' inquiries. The system may also dispense brochures which may be helpful to the users or other items such as train or bus passes, maps, or even detailed directions. Such a system may also be adapted to understand various different languages and respond in the languages received.

Because of the increased prevalence of various technologies in the automobile environment such as navigation systems and advances entertainment systems and the need for the operator of an automobile to stay alert to the outside environment while driving, one embodiment of the present invention may be an artificial intelligence system implemented in an automobile. Such a system would receive speech from a user and interact with the various systems of the car to execute user commands and provide information to the user. The system would also be able to understand inquiries of a user and respond intelligently. Using this system, the user is able to obtain information and execute actions without ever having to remove hands from the controls of the automobile.

In another embodiment, a system according to the present invention may be an advanced artificial intelligence system implemented in a home environment for individuals, such as, for example, physically challenged individuals, particularly those with limited motor skills. Such a system would allow hands-free interaction with various devices and appliances commonly used by such individuals at home, such as the telephone, television, oven, and microwave. The system would allow the user to control the devices and even ask questions concerning the devices. The system may also ask the user questions or notify the user if certain events occur, such as if the oven is left on for too long or if the telephone is left off the hook. In embodiments where the system is adapted to interact with physically challenged individuals, the system may be adapted to contact authorities or medical personnel upon the request of a user or upon the occurrence of an event such as a non-responsive user.

In one embodiment, the system stores user profile information for at least one user which allows the system to access previous information input by the user or preferences set by the user. The user profile may also store previous exchanges with the user in order to provide context for future exchanges, revisit topics previously discussed, prevent repeating previous answers that were not desired by the user, or tag previous answers or actions that were desirable to the user. The user profile may be accessed by allowing a user to log in to a system according to the present invention with a username. In another embodiment, the user may be automatically recognized by the system using other identification means, such as, for example, a telephone number or biometric information such as, for example, voice, fingerprint, DNA, retinal scan, facial scan, vein pattern recognition, etc.

In one embodiment, the present invention comprises a method for a computer system to interpret an input from a user and generate a response, comprising receiving a user input, converting the user input into an input array having a plurality of concepts, determining if any of the plurality of concepts in the input array is derived from a root concept, if any of the plurality of concepts is derived from a root concept, replacing each such derived concept with the corresponding root concept, identifying one or more related concepts that relate to the root concept, and generating a multi-dimensional array based on the input array that includes the one or more related concepts, correlating a concept in the multi-dimensional array to a first element in a database, wherein the first element in the database includes a link to a second element in the database, determining a plurality of possible responses to the user input based on the correlation of the multi-dimensional array and the database, and generating a response to the user input. The response may be presented in a textual, audio, visual, or audiovisual format. The response to the user input may be generated based on a selection of one of the plurality of possible responses.

In a further embodiment, the method further comprises determining if any two or more concepts in the input array comprise a composite concept, and if so, replacing the two or more concepts with the composite concept.

The response to the user input may be generated based on a selection of predefined output elements that correlate to the one or more concepts in the multi-dimensional array. In a further embodiment, the selection of the predefined output elements is based on an identification of one or more closest correlations to the one or more concepts in the multi-dimensional array.

In one embodiment, the multi-dimensional array comprises a plurality of tokens and wherein each token corresponds to a concept.

In one embodiment, wherein generating a response comprises analyzing a plurality of possible responses for the response that more closely relates to the correlation than the other possible responses, and generating a set of tokens to form the response that more closely relates to the correlation.

In one embodiment, generating a response to the user input comprises executing at least one transaction. The transaction may be execution of a script, invocation of a web service, execution of an API call, or interacting with an external system.

In one embodiment, the link is a pointer.

In one embodiment, the method further comprises generating an output array to use in responding to the user input wherein the output array is based on an analysis of a selection of predetermined output elements.

In one embodiment, the method further comprises identifying a first token from the multi-dimensional array as data to be stored in memory for later use.

In one embodiment, the invention is a method for a computer system to interpret an input from a user and generate a response, comprising receiving the user input in a first format, converting the user input into a second format comprising a one-dimensional token array having at least one token, wherein each token corresponds to a portion of the user input, generating a root token array, corresponding to the one-dimensional token array, having at least one root token, wherein each root token corresponds to the root from which one of the one-dimensional tokens is derived, generating a multi-dimensional token array, based on the root token array, having a plurality of tokens, wherein each token corresponds to at least one root token, and correlating a token in the multi-dimensional token array to a first element in a database, wherein the first element in the database includes a link to a second element in the database, and generating a response to the user input. The user may be a human and/or a computer. The response may be presented in a textual, audio, visual, or audiovisual format.

The method may further comprise determining if any two or more tokens in the input array comprise a composite token, and if so, replacing the two or more tokens with the composite token.

In one embodiment the method may further comprise determining a plurality of possible responses to the user input based on the correlation of the multi-dimensional array and the database. The response to the user input may be generated based on a selection of predetermined output elements that correlate to tokens in the multi-dimensional array. In one embodiment, generating a response further comprises analyzing a plurality of possible responses for the response that more closely relates to the correlation than the other possible responses and selecting one or more predetermined output elements to form the response that more closely relate to the correlation. In another embodiment, selection of the predetermined output elements is based on an identification of one or more closest correlations to the tokens in the multi-dimensional array.

In one embodiment, the multi-dimensional token array comprises a plurality of tokens, wherein each token corresponds to a concept.

In one embodiment, generating a response comprises analyzing a plurality of possible responses for the response that more closely relates to the correlation than the other possible responses and generating a set of tokens to form the response that more closely relates to the correlation.

In another embodiment, generating a response to the user comprises executing at least one transaction. The transaction may be the execution of a script, invocation of a web service, execution of an API call, and/or interacting with an external system.

In one embodiment, the link is a pointer.

In one embodiment, the method further comprises generating an output array to use in responding to the user input, wherein the output array is based on an analysis of a selection of predetermined output elements.

In one embodiment, each token is an integer.

In one embodiment, the method further comprises assigning each token a corresponding integer. Each token may correspond to a concept.

In one embodiment, the user is a human. In another embodiment, the user is a computer or computer program.

In one embodiment, the invention is a method for a computer system to interpret an input from a user and generate a response, comprising receiving the user input in a first format, converting the user input into a second format comprising a one-dimensional token array having at least one token, wherein each token corresponds to a portion of the user input, generating a root token array, corresponding to the one-dimensional token array, having at least one root token, wherein each root token corresponds to the root from which one of the one-dimensional tokens is derived, generating a multi-dimensional token array, based on the root token array, having a plurality of tokens, wherein each token corresponds to at least one root token, determining a match between the multi-dimensional token array and the one-dimensional token array, and generating a response to the user input using a combination of tokens.

In one embodiment, the invention is a method for a computer system to interpret an input from a user and generate a response to the user input, comprising receiving the user input, converting the user input into a one-dimensional token array having at least one token, wherein each token corresponds to a portion of the user input, generating a root token array, corresponding to the one-dimensional token array, having at least one root token, wherein each root token corresponds to the root from which one of the one-dimensional tokens is derived, generating a multi-dimensional token array, based on the root token array, having a plurality of tokens, wherein each token corresponds to at least one root token, and determining a match between the multi-dimensional token array and the one-dimensional token array, wherein determination of the match comprises traversing the multi-dimensional token array to identify a combination of tokens in the multi-dimensional token array, wherein the combination of tokens corresponds to a dimension of the multi-dimensional token array, comparing the combination of tokens corresponding to the dimension of the multi-dimensional token array to the tokens from the one-dimensional token array, determining a weighting for the combination of tokens, storing the weighting and an identification of the combination of tokens in a memory, determining a plurality of possible responses to the user input, and generating a response to the user input.

In a further embodiment of the method, the combination of tokens is a first combination of tokens and the dimension of the multi-dimensional token array is a first dimension, and further comprising repeating steps of traversing the multi-dimensional token array to identify a combination of tokens in the multi-dimensional token array, wherein the combination of tokens corresponds to a dimension of the multi-dimensional token array, comparing the combination of tokens corresponding to the dimension of the multi-dimensional token array to the tokens from the one-dimensional token array, determining a weighting for the combination of tokens, and storing the weighting and an identification of the combination of tokens in a memory to identify a second combination of tokens wherein the second combination of tokens corresponds to a second dimension of the multi-dimensional token array, and to identify a second weighting, comparing the first weighting to the second weighting, if the second weighting is greater than the first weighting, storing the second weighting and an identification of the combination of tokens in a first location of the memory and the first weighting and an identification of the combination of tokens in a second location of memory, otherwise storing the second weighting and an identification of the combination of tokens in the second location of the memory and the first weighting and an identification of the combination of tokens in the first location of memory.

In one embodiment, the method further comprises identifying a first token from the multi-dimensional token array as data to be stored in memory for later use.

In one embodiment, determining a weighting for the combination of tokens includes determining a weighting of individual tokens and determining a weighting of the combination of tokens.

In one embodiment, determining a match between the multi-dimensional token array and the one-dimensional token array comprises determining a best match from a plurality of possible matches.

In one embodiment, the value of the weighting increases as the number of matches increases.

In one embodiment, the memory is a database. In another embodiment, the memory is a memory stack. In a further embodiment, the first location of memory is a first location of the memory stack and the second location of memory is a second location of the memory stack, and wherein the first location of the memory stack is located above the second location of the memory stack. In another embodiment, the stack is reordered based on variable data. The variable data may be contextual data.

In one embodiment, the memory stack is reordered based on predetermined data. In another embodiment, the memory stack is reordered based on a combination of variable data and predetermined data.

In one embodiment of the method, the user is a human. In another embodiment, the user is a computer or computer program.

In one embodiment, the invention is a method for a computer system to interpret an input from a user and generate a response, comprising receiving the user input, converting the user input into a one-dimensional token array having at least one token, wherein each token corresponds to a portion of the user input, generating a root token array, corresponding to the one-dimensional token array, having at least one root token, wherein each root token corresponds to the root from which one of the one-dimensional tokens is derived, generating a multi-dimensional token array, based on the root token array, having a plurality of tokens, wherein each token corresponds to at least one root token, and determining a match between the multi-dimensional token array and a predetermined input pattern, wherein determination of the match comprises traversing the multi-dimensional token array to identify a combination of tokens in the multi-dimensional token array, wherein the combination of tokens corresponds to a dimension of the multi-dimensional token array, comparing the combination of tokens corresponding to the dimension of the multi-dimensional token array to the tokens from the predetermined input pattern, determining a weighting for the combination of tokens, storing the weighting and an identification of the combination of tokens in a memory, determining a plurality of possible responses to the user input, and generating a response to the user input.

In one embodiment, the combination of tokens is a first combination of tokens, the dimension of the multi-dimensional token array is a first dimension, the predetermined input pattern is a first predetermined input pattern, the weighting is a first weighting, the memory is a first memory location, and further comprising repeating the steps of traversing the multi-dimensional token array to identify a combination of tokens in the multi-dimensional token array, wherein the combination of tokens corresponds to a dimension of the multi-dimensional token array, comparing the combination of tokens corresponding to the dimension of the multi-dimensional token array to the tokens from the predetermined input pattern, determining a weighting for the combination of tokens, and storing the weighting and an identification of the combination of tokens in a memory to identify a second combination of tokens wherein the second combination of tokens corresponds to a second dimension of the multi-dimensional token array, and to identify a second weighting, comparing the first weighting to the second weighting, if the second weighting is greater than the first weighting, storing the second weighting and an identification of the second combination of tokens in a first location of the memory and the first weighting and an identification of the first combination of tokens in a second location of memory, otherwise storing the second weighting and the identification of the second combination of tokens in the second location of the memory and the first weighting and the identification of the first combination of tokens in the first location of memory, repeating the steps of comparing the combination of tokens corresponding to the dimension of the multi-dimensional token array to the tokens from the predetermined input pattern, determining a weighting for the combination of tokens, and storing the weighting and an identification of the combination of tokens in a memory using a second predetermined input pattern to determine a third weighting, comparing the third weighting to the greater of the first weighting and the second weighting, if the third weighting is greater than the first weighting and the second weighting, storing the third weighting and an identification of the combination of tokens in the first location of the memory, and wherein the response to the user input is generated using the combination of tokens located in the first location of the memory.

In one embodiment, the invention is a method for generating a response to a user input to a microprocessor based device, comprising generating sequential conceptual tokens from the user input, using the sequential conceptual tokens to extract conceptual sub-strings from a database, replacing sequential conceptual tokens with corresponding stored values, assembling an output string using relationships to the stored values, presenting the output string to the user; and storing the output string in memory. The output string may be presented in a textual, audio, visual, or audiovisual format. In one embodiment, the output string is stored as a log file or as results to be stored in a database.

In one embodiment, the memory is a database.

In one embodiment, the invention is a method for dynamically constructing an output, comprising sampling a source of data, identifying a set of tokens preferred for the output, selecting a first token based on predetermined criteria including a set of selectable data and based on the set of tokens preferred for the output, analyzing the source of data, using the first token, to determine a first subset of data to be used for selection of a second token, selecting the second token based on the first token, the first subset of data, and the tokens remaining from the set of tokens preferred for the output, analyzing the source of data, using the first token and the second token, to determine a second subset of data to be used for selection of a third token, selecting a third token based on the first token, the second token, the second subset of data, and the tokens remaining from the set of tokens preferred for the output, and generating the output using the first token, the second token and the third token.

In one embodiment, the set of tokens preferred for the output are required for the output.

In one embodiment, the set of selectable data is a limited set of data.

In one embodiment, the first subset of data and the second subset of data are non-overlapping. In another embodiment, the first subset of data and the second subset of data are partially overlapping.

In one embodiment, the output is a first output and further comprising repeating all of the steps of the method to generate a second output and comparing the first output to the second output and selecting the first output or the second output based on which of the first output and the second output provides a better response to the user input.

In one embodiment of the method, generating the output further comprises determining whether any combination of two or more tokens corresponds to a new token stored in a database, if a combination of two or more tokens corresponds to a new token stored in a database, then substituting the combination of tokens for the new token, and if the new token corresponds to a plurality of tokens in the database, replacing the new token with the plurality of tokens.

In another embodiment of the method, generating the output further comprises determining a possible replacement token that corresponds to one of the tokens, and selecting between the possible replacement token and the old token based on predetermined criteria.

In one embodiment, the generating a response to the user input comprises executing at least one transaction. The transaction may be execution of a script, invocation of a web service, execution of an API call, and/or interacting with an external system.

In one embodiment, the output is in the form of speech generation, text output, graphical displays, audio output, or execution of a program.

In one embodiment, the invention is a method for automatically generating an output to a user input comprising receiving a user input, transforming the user input into tokenized conceptual data, annotating the tokenized conceptual data, filtering annotated tokenized data to extract core conceptual data, pushing at least one of filtered conceptual data and non-filtered conceptual data onto a stack, statistically sampling the stack of data for relevant conceptual tokens, giving more recent additions priority, filtering selected conceptual tokens; and generating an output based on the filtered selected conceptual tokens.

In one embodiment, the method is implemented as a user interface to a device. The device may be a camera, telephone, personal digital assistant, toy, doll, appliance, automobile, or any computer environment.

In one embodiment, the method is implemented as an interface to a search engine. In another embodiment, the method is implemented as a universal interface. The universal interface may be an interface to an operating system.

In one embodiment, the method may be implemented as a customer service system. The customer service system may be a telephone call center and/or a web page.

In one embodiment, the method may be implemented on a plurality of devices. The plurality of devices may communicate with each other and/or share information with each other. The plurality of devices may comprise toys. The plurality of devices may comprise computer environments.

In another embodiment, the method may be implemented on a primary device which directs the actions of a plurality of secondary devices. The secondary devices may be toys. In another embodiment, the secondary devices may be computer environments.

In one embodiment, the output is an audiovisual avatar in a computer environment. The computer environment may be a customer service web page. In another embodiment, the computer environment is a game.

In one embodiment, the output is generated in an audio format for the visually impaired. In another embodiment, the output is generated in a visual format for the hearing impaired.

In one embodiment, the invention is a software storage medium including a software program which, when executed by a processing arrangement, is configured to interpret an input from a user and generate a response, said software program comprising a first module which, when executed, receives a user input, a second module which, when executed, converts the user input into an input array having a plurality of concepts, a third module which, when executed, determines if any of the plurality of concepts in the input array is derived from a root concept and if any of the plurality of concepts is derived from a root concept, replaces each such derived concept with the corresponding root concept, identifies one or more related concepts that relate to the root concept, and generates a multi-dimensional array based on the input array that includes the one or more related concepts, a fourth module which, when executed, correlates a concept in the multi-dimensional array to a first element in a database, wherein the first element in the database includes a link to a second element in the database, a fifth module which, when executed, determines a plurality of possible responses to the user input based on the correlation of the multi-dimensional array and the database, and a sixth module which, when executed, generates a response to the user input.

In one embodiment, the invention is a system for interpreting an input from a user and generating a response comprising an input device for receiving the input from the user, a memory, the memory including a database, a processor coupled to the input device and the memory, the processor adapted to convert the input into an input array having a plurality of concepts, determine if any of the plurality of concepts in the input array is derived from a root concept and if any of the plurality of concepts is derived from a root concept replace each such derived concept with the corresponding root concept, identify one or more related concepts that relate to the root concept, and generate a multi-dimensional array based on the input array that includes the one or more related concepts, correlate a concept in the multi-dimensional array to a first element in the database, wherein the first element in the database includes a link to a second element in the database, determine a plurality of possible responses to the user input based on the correlation of the multi-dimensional array and the database, and an output device adapted to communicate the response to the user.

In one embodiment of the system, the input device is a microphone. In another embodiment, the input device comprises a keyboard, a mouse, a telephone line, and/or a data feed.

In one embodiment of the system, the output device is a speaker. In another embodiment, the output device comprises a telephone line, a data feed, a speaker, and/or a graphical display.

In one embodiment, the input device includes a speech recognition module.

In one embodiment, the output device includes a speech generation module.

In one embodiment, the system is implemented as a training program for training users.

In one embodiment, the system is implemented as an interface to a search engine.

In one embodiment, the processor is further adapted to allow a user to define input concepts, define concepts and define relations between concepts.

BRIEF DESCRIPTION OF THE FIGURES

FIG. 8 shows one embodiment of a programming interface which allows a user to accomplish a binding between concepts.

FIG. 9 depicts one embodiment of an interface adapted to allow a user to train the system.

DETAILED DESCRIPTION

Figure 1:
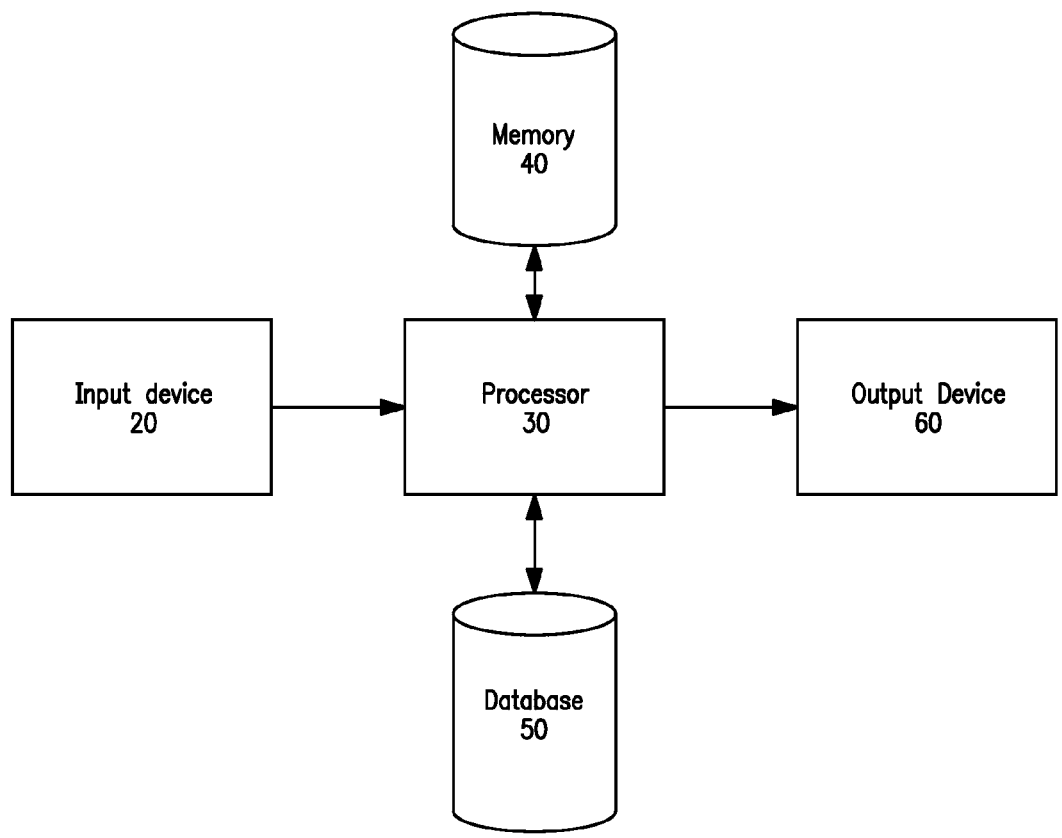
FIG. 1 is a system diagram of a preferred embodiment of an artificial intelligence system according to the present invention.
Figure 2:
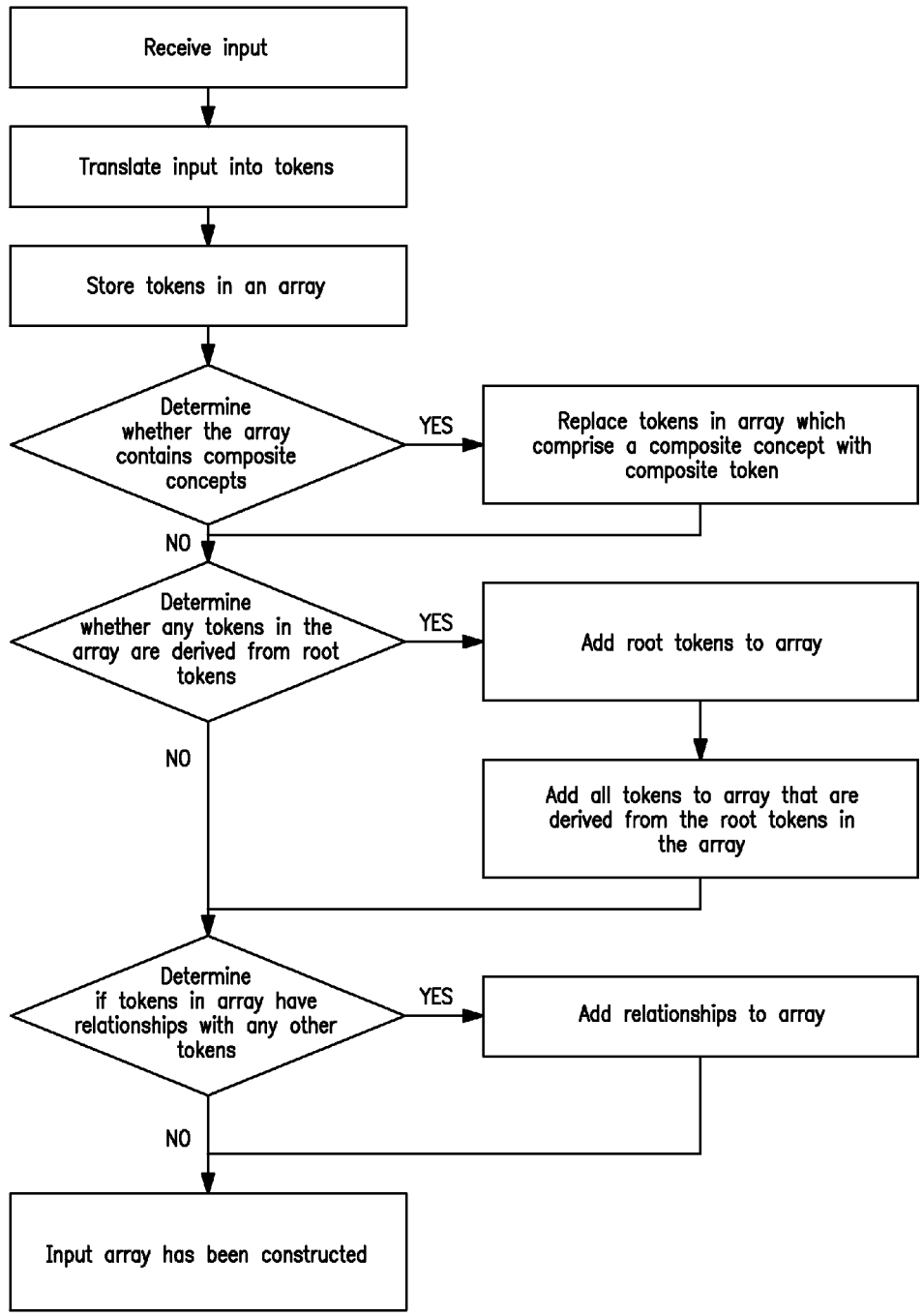
FIG. 2 is a flow diagram depicting the construction of an input array according to one embodiment of the present invention.
Figure 3:
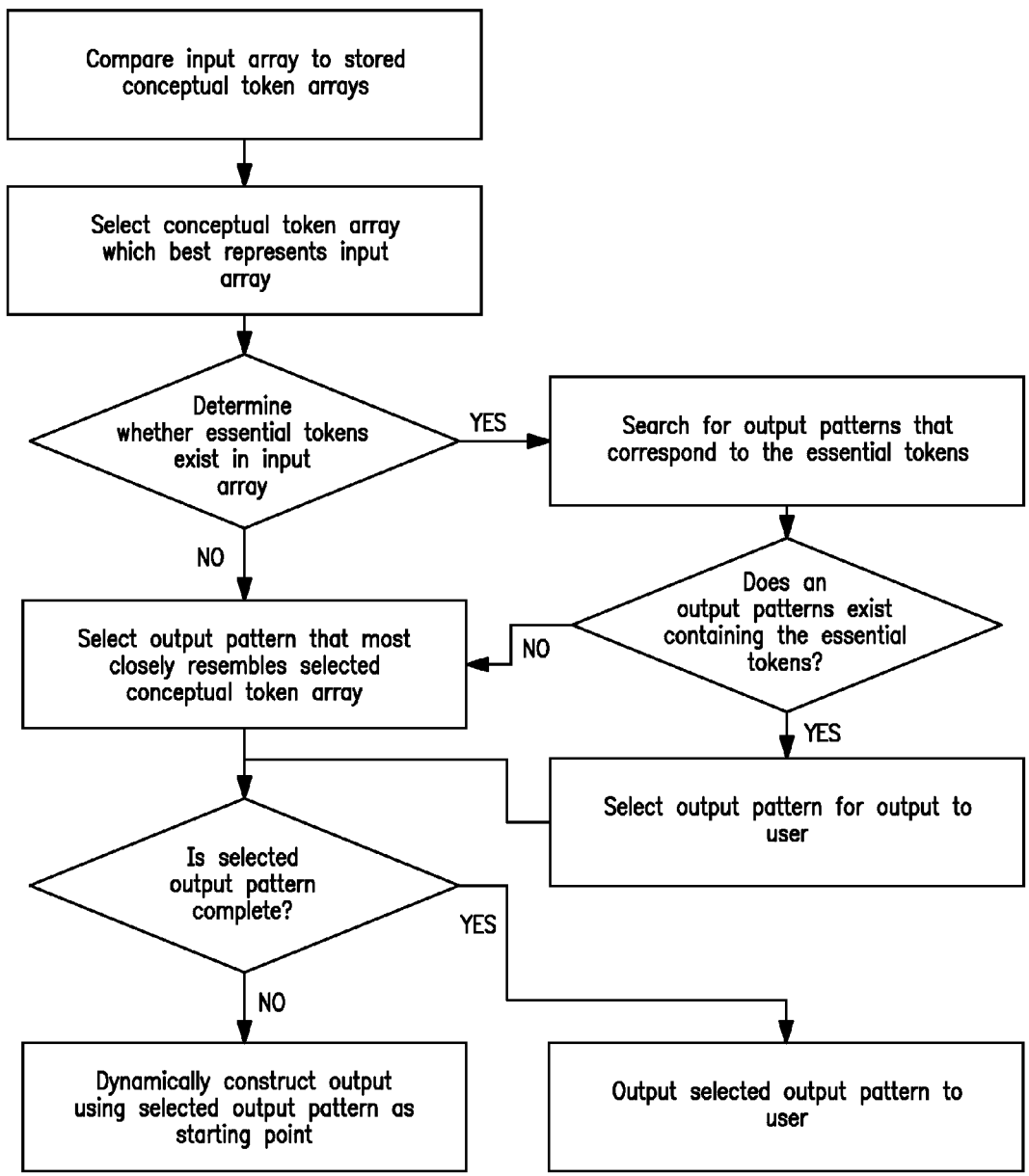
FIG. 3 is a flow diagram depicting an output selection method according to one embodiment of the present invention.
Figure 4:
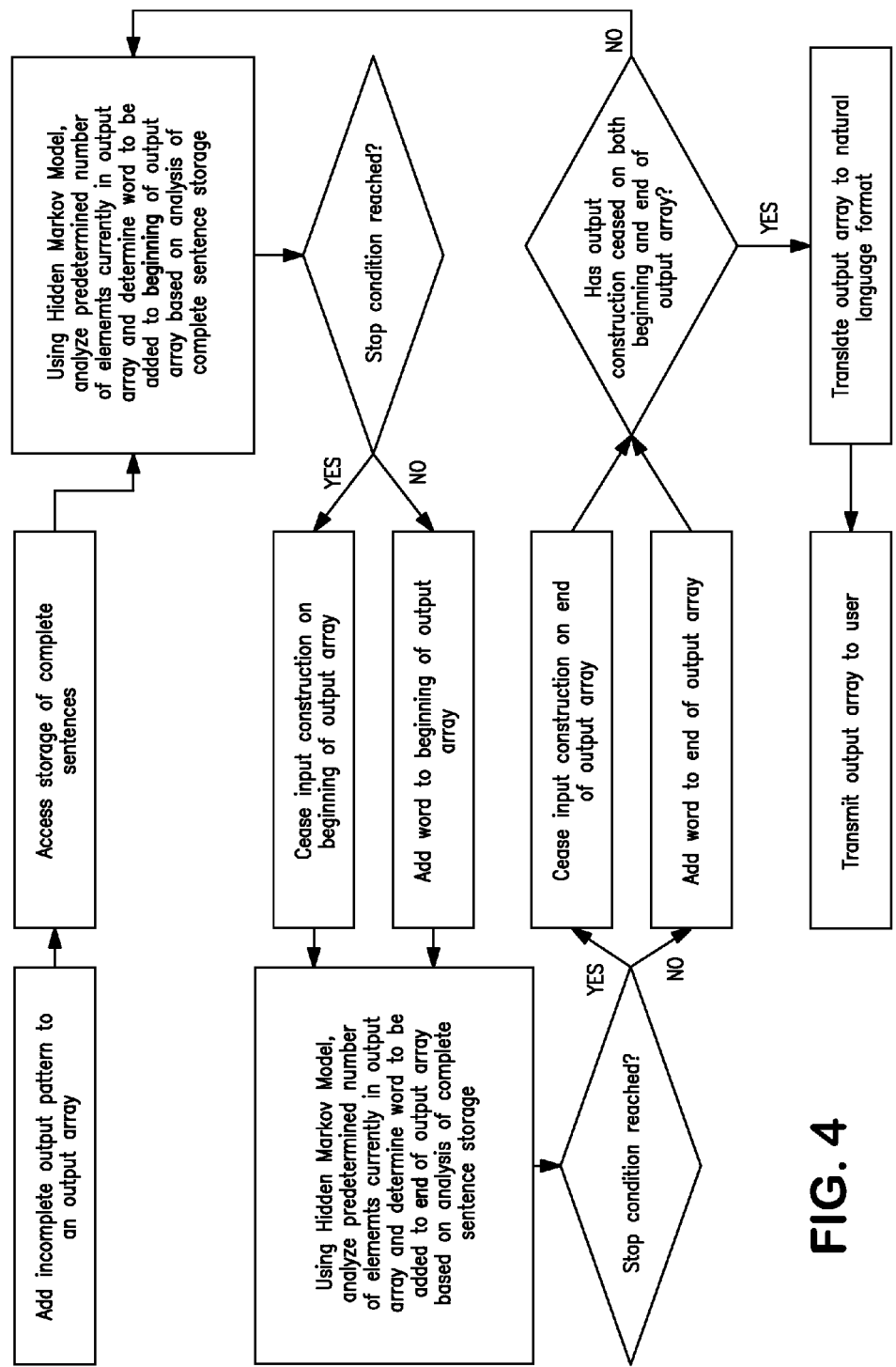
FIG. 4 is a flow diagram depicting a dynamic output construction method according to one embodiment of the present invention.

The present invention is a system and method for receiving input from various sources including but not limited to direct user input and producing intelligent behaviors and/or responses based on one or more of the input, programmatic restraints, data sources, internal cognitive feedback, training parameters, and predetermined conditions.

In a first embodiment, a system according to the present invention comprises an input device 20 for receiving input from a user. In this embodiment the input device is a microphone for receiving speech input from a user, but the input device may additionally or alternatively be a keyboard for receiving typed input or any other type of input device known in the art.

More than one input device may also be used with a system according to the present invention. In an embodiment where a system according to the present invention functions on a cellular telephone, for example, the input device may comprise both a keypad and a microphone.

A system according to the present invention may operate with natural speech of a user. The invention may utilize a speech capturing device as an input device and voice recognition software as known in the art to reduce natural speech to a string of text. The software may adapt to the voice of the user to more easily understand the natural language of a user and even understand expressions particular to a geographical region.

The input device 20 transmits input to the processor 30. The processor may be a central processing unit (CPU) as known in the art. The system may also contain at least one memory 40 for storing program data which controls the processor, and at least one database 50 for storing information used by the system. In some embodiments, a system according to the present invention may also utilize an output device 60, such as a monitor or a speaker, for transmitting output to a user. The output device may be a combination of elements, such as a moving picture with accompanying sound on a computer monitor and speakers.

A system according to the present invention receives input from a user and generates output to the user. The input is received in a first format. The input is then translated into a second format such as an integer format. The input may be broken into tokens which are each assigned a corresponding integer. The input is stored in an input array, which is a one-dimensional linear array that contains one token for each integer or item of input. For example, if input such as the phrase "C is for cookie" is received from a microphone in audio format, the input will be converted into text. The text of the phrase is broken into tokens, so each word is assigned a separate token. Each token is assigned an integer value, so the token "cookie" may be assigned a value of "0056."

The tokens are assigned predetermined integer values based on a database available to the system that stores integer values for all words. Various different tokens that have the same meaning, such as "cookie" and "cookies" may be assigned the same integer value.

Once the one-dimensional linear array is constructed, the system may then determine whether one or more tokens in the input array correlate to one or more predetermined criteria, such as for example, whether any one or more tokens in the array comprise a term of art or if two or more tokens in the array comprise a composite concept. This occurs when a string of words is meant to express a single idea. In one embodiment, if any one or more tokens are found to comprise a term of art or if one or more tokens are found to comprise a composite concept, they are replaced in the input array by a token representing the corresponding term of art or composite concept. In another embodiment, one or more tokens representing the term of art or composite concept may be added to the input array.

An example of a composite concept is if the one-dimensional linear array contains the words "clockwork" and "orange" next to each other, these words will be combined into one composite concept which represents the name of a book and movie. The system preferably has access to a database or other storage of composite concepts and compares the input to the composite concepts to determine if any composite concepts are present in the input array. Thus, using the above example, if the word "clockwork" is represented by the integer 012 and the word "orange" is represented by the integer 056, the system will recognize that whenever these two words are adjacent to each other in this order, they should be combined and represented by the integer 129.

Common phrases may also be converted from a plurality of integers into a single integer. For example, the words "May I please have" may be represented by the integer values 001, 002, 003, and 004. The words, "Can you get me" may be represented by the integer 005, 006, 007, and 008. However, because these two strings mean the same thing, they may both be stored in the string database under the variable 056. The system will then convert these strings into the variable 056, which reduces the number of variables the system must work with and thus reduces processing time for analyzing the input and formulating a response.

The system according to the present invention determines whether one or more tokens in the input array correlates to any root token from which such token is or such tokens are derived. If a relationship is found between any token in the input array and any root token, the root token will be used in place of the token from the input array for which a relationship is found, for example, by converting or transforming it into the root token, replacing it with the root token or the root token may be added to the input array.

For example, the token "cookies" derives from the root token "cookie." The tokens "going" "went" "go" are all derived from the root token "go." The tokens "dogs," "canine," "canines," "hound," and "hounds" are all derived from the root token "dog."

Figure 5:
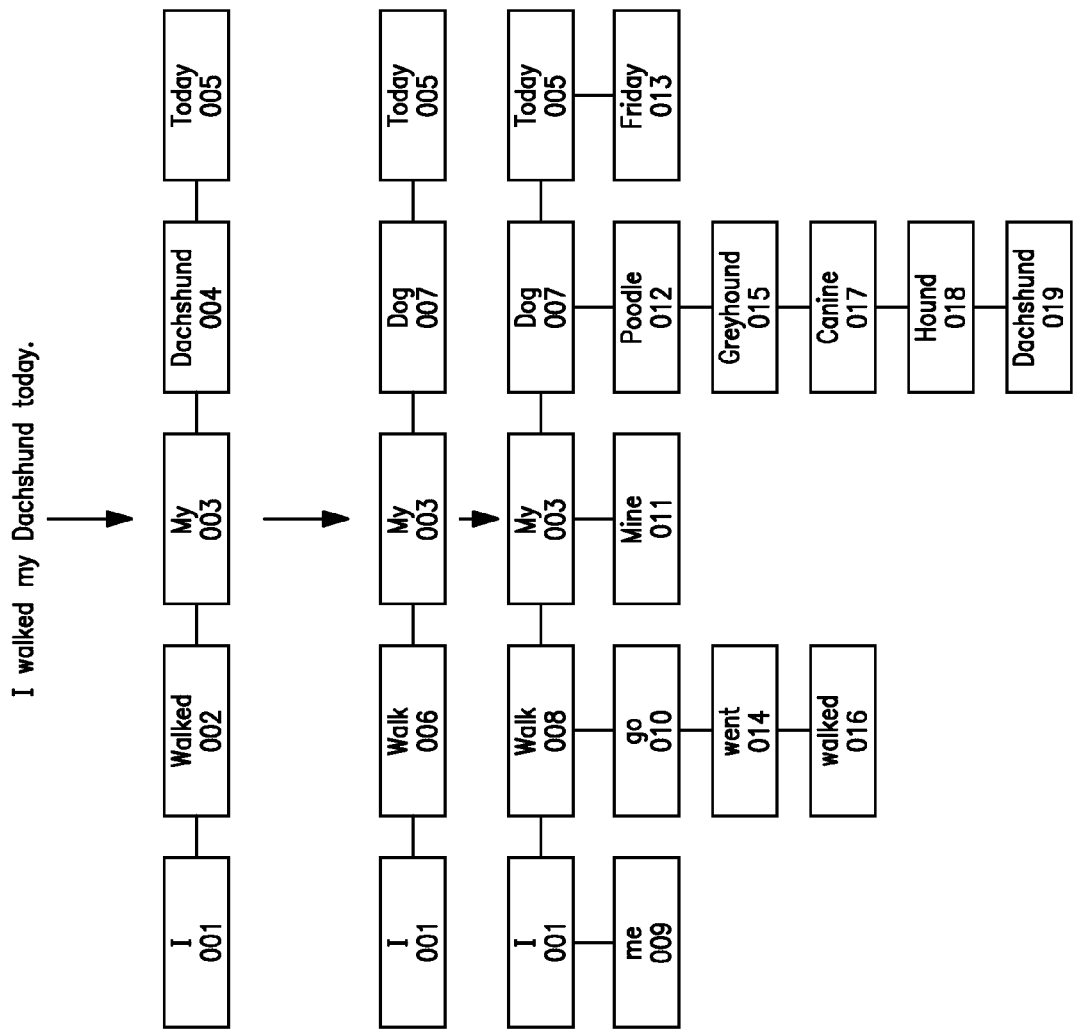
FIG. 5 is a flow diagram depicting the expansion of an input array into a multi-dimensional array according to one embodiment of the present invention.
Figure 5:
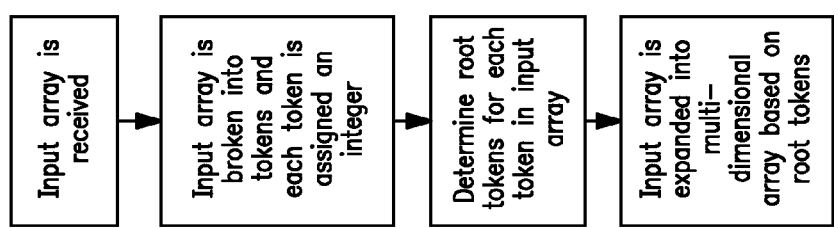

The input array is expanded into a multi-dimensional array. One example of an embodiment of this process is depicted in FIG. 5. A string of input, such as "I walked my dog today" is received. The input is broken into tokens which are each assigned a predetermined integer. A root token is determined, if available, for every token in the input array. In this example, "walked" has a root token of "walk" and "Dachshund" has a root token of "dog." If a root token exists for any token in the input array, the root token takes the place of the token in the input array, so "walked" is replaced with "walk" and "Dachshund" is replaced with "dog." The input array is then expanded into a multi-dimensional array including all tokens that are related to the tokens in the input array or alternatively all tokens that may be derived from the root token. In this example, the array is expanded into a multi-dimensional array by adding all tokens related to the tokens in the array, so "Poodle" and "Greyhound" are added to the array because they are related to "dog." "Friday" is added to the array because it is related to the token "today" and "Mine" is added to the array because it is related to the token "My."

The formula for calculating the number of linear arrays is as follows: $(X_1+1)(X_2+1)(X_3+1) \ldots (X_n+1)$ where n is the number of tokens in the array and X is the number of tokens corresponding to the each root token. When applied to the example shown in FIG. 5, the input array is expanded into 192 separate linear arrays. There are 5 tokens in the array, so the formula would look as follows: $(X_1+1)(X_2+1)(X_3+1)(X_4+1)(X_5+1)$. The "X" for each token is replaced by the number of tokens corresponding to each token, so the formula would look as follows once the input array was expanded as shown in FIG. 5: $(1+1)(3+1)(1+1)(5+1)(1+1)$. These numbers represent the number of tokens added to each token in the array, so for example "5" was added to the fourth token in the array because there are 5 related tokens to "dog." The formula produces 192 unique linear arrays: $(2)(4)(2)(6)(2)=192$.

Figure 6:
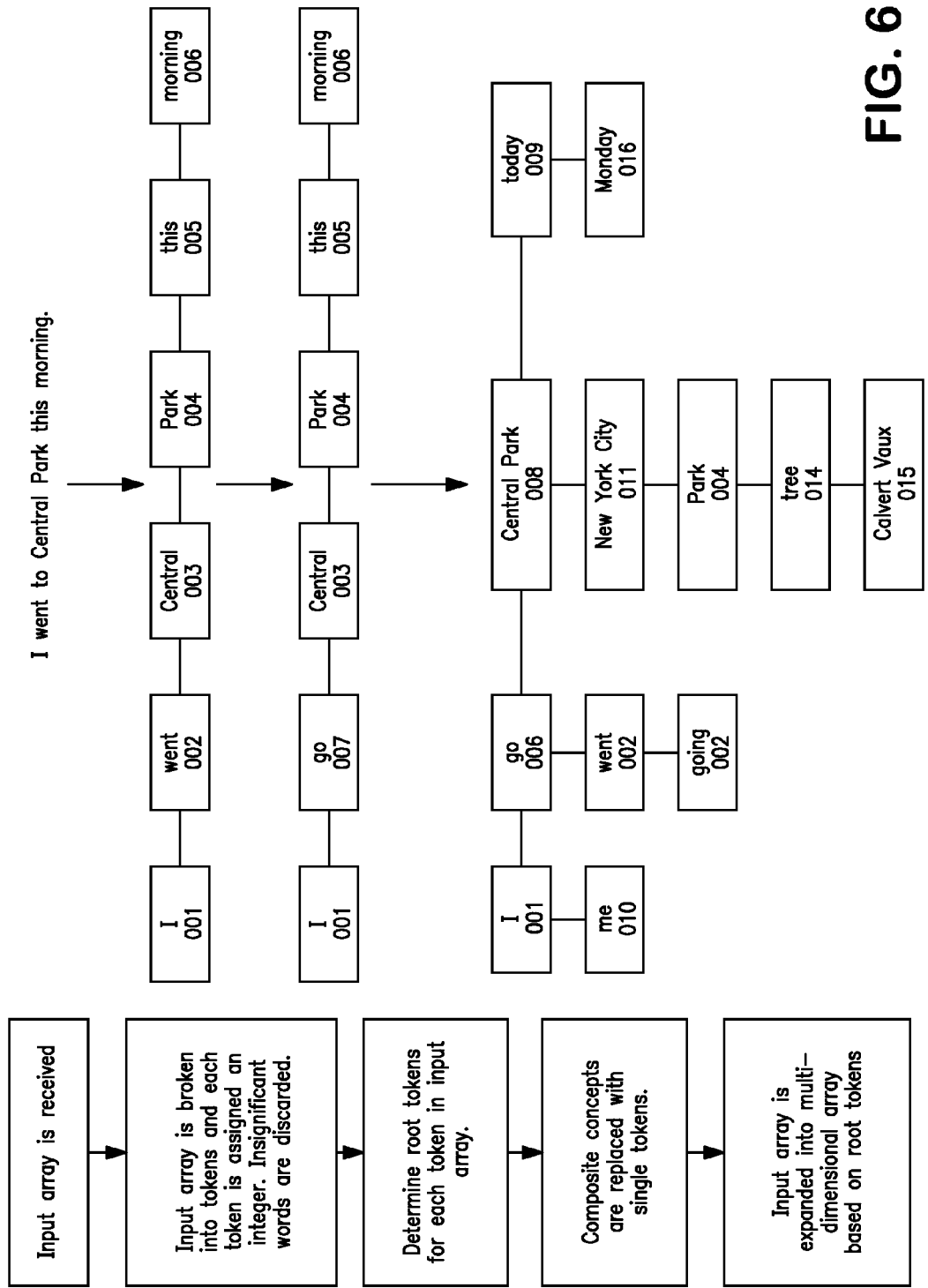
FIG. 6 is a flow diagram depicting the expansion of an input array into a multi-dimensional array according to one embodiment of the present invention.

Another example of an input statement being transformed into a multi-dimensional array is depicted in FIG. 6. The phrase "I went to Central Park this morning" is input into the system. The input is broken into tokens and added to an input array. Insignificant words, such as in this case the word "to", are discarded and not added to the input array in this example in order to speed processing. Each token is assigned a predetermined integer value. The system determines whether each token in the array has a corresponding root token. If a corresponding root token exists for any token in the input array, the corresponding root token will replace the token in the input array. In this example, the token "went" has a corresponding root token of "go" so the token for "go" will replace the token for "went" in the input array. In the next step, the system will search the tokens in the input array to see if any groups of tokens in the input array comprise a composite concept. In this example, the tokens representing the words "Central" and "Park" represent a composite concept for the concept "Central Park." The tokens representing the words "Central" and "Park" are then replaced by a single token for the concept "Central Park" in the input array. The tokens representing the words "this" and "morning" may also be replaced by a single token representing the concept "today." This may be accomplished by simply searching a database of composite concerts that dictate to the system that when two particular tokens are next to each other in a given order, they represent a composite concept. The input array is then expanded into a multi-dimensional array to include all tokens related to the tokens in the input array. In this example, the token for the word "me" is added because it is related to the token for the word "I," the tokens for the word "went" is added because it relates to the token "go," and the tokens "New York City," "park," "tree," and "Calvert Vaux" are added because they relate to the composite token "Central Park."

The system stores a weight value for each concept. The weight value for each concept is then correlated with or assigned to a token in the input array for example, when the integer value for the token is assigned or thereafter.

For example, if the word "dog" is received as input, the system locates the concept "dog" in the database, then stores the integer value of "dog" from the database into the input array as a representation of the word "dog." The weight of the concept "dog" may be represented by a value such as a floating point value and may also be correlated to the integer representing "dog" and stored temporarily or permanently in the input array. The integer value of the concept "dog" and the corresponding weight of that concept may be stored within the input array or independently of the input array.

The weight may be used to signify the importance of the various elements in the array, such as, for example, the linear array or multi-dimensional arrays. In one embodiment, the various elements in the linear array are assigned a weight based on how frequently the elements appear in the various databases attached to the system, which will be discussed further herein. There may be a minimum value involved; for example if the various databases attached to the system contain only twenty sentences or statements, they may not be used for weighting because they will fail to provide an accurate portrayal of the importance of the term. For example, an element that rarely appears in the database may be assigned a high weight. In one embodiment, the weight of each element may be modified based on the part of speech of the element. For example, articles such as "the" are assigned a low weight while nouns such as "dog" are assigned a higher weight. Certain elements may be assigned a higher weight by a user for a particular application. The weight of an element may also be modified based on how many concepts are related to that particular element. The weight of an element may also be normalized based on weight of the element as a percentage of the maximum possible weight of any element in the system, so that the weight of every element in the system will range from 0.0 to 1.0.

In another embodiment, the system will access a database such as an external database to obtain weight information. The external database may be accessed over a network such as the Internet and may contain information such as a dictionary or encyclopedia. The system may determine the weight of a concept based on the number of times the term appears in the external database or the amount of information contained in the external database concerning the concept. For example, if the term "elephant" has a number of articles about it stored in the external database, the term may be assigned a high weight.

The system will access an Internet search engine and perform a search for each concept in the concept database. A weight will be assigned to each concept based on how many search results the search engine discovers for each concept.

A concept may have a plurality of weight values. For example, the concept may have a weight value based on how many hits appear for that concept in an Internet search engine and a separate weight value based on the number of relationships to other concepts the concept has. The concept may have a separate weight based on which part of speech the concept represents. These weights may be averaged to produce a single weight for a concept. Each token may be assigned a normalized weight based on a relationship of the weight to the maximum possible weight for any given token.

The system may include a table of common concepts that are assigned predetermined weights without searching any databases or external sources. These common concepts include words such as "the," "an," and "a" and may be assigned a low weight.

In another embodiment, concepts which are synonyms will share a weight. The relationships between two concepts which mean the same thing may be created by a user or may be extracted from a database, such as a dictionary. Once a weight is calculated for one of the concepts, the relationship between it and its synonyms will be used to assign the same weight to its synonyms. Alternatively, a different weight may be assigned to a synonym based on a variety of factors such as, for example, common usage, context, or past history.

In one embodiment, each concept is bound to a number of other concepts and a user may edit or create bindings between concepts. One embodiment of a programming interface which allows a user to accomplish a binding between concepts is depicted in FIG. 8. This interface shows the concept "dog," its weight, its bound concepts, and the type of bindings for each bound concept. For example, the concept "canine" is bound to the concept "dog" as a synonym while the concept "pet" is a parent concept to the concept "dog." A user may create bindings to other concepts or modify the bindings of a concept using an interface such as the one shown in FIG. 8.

Figure 9:
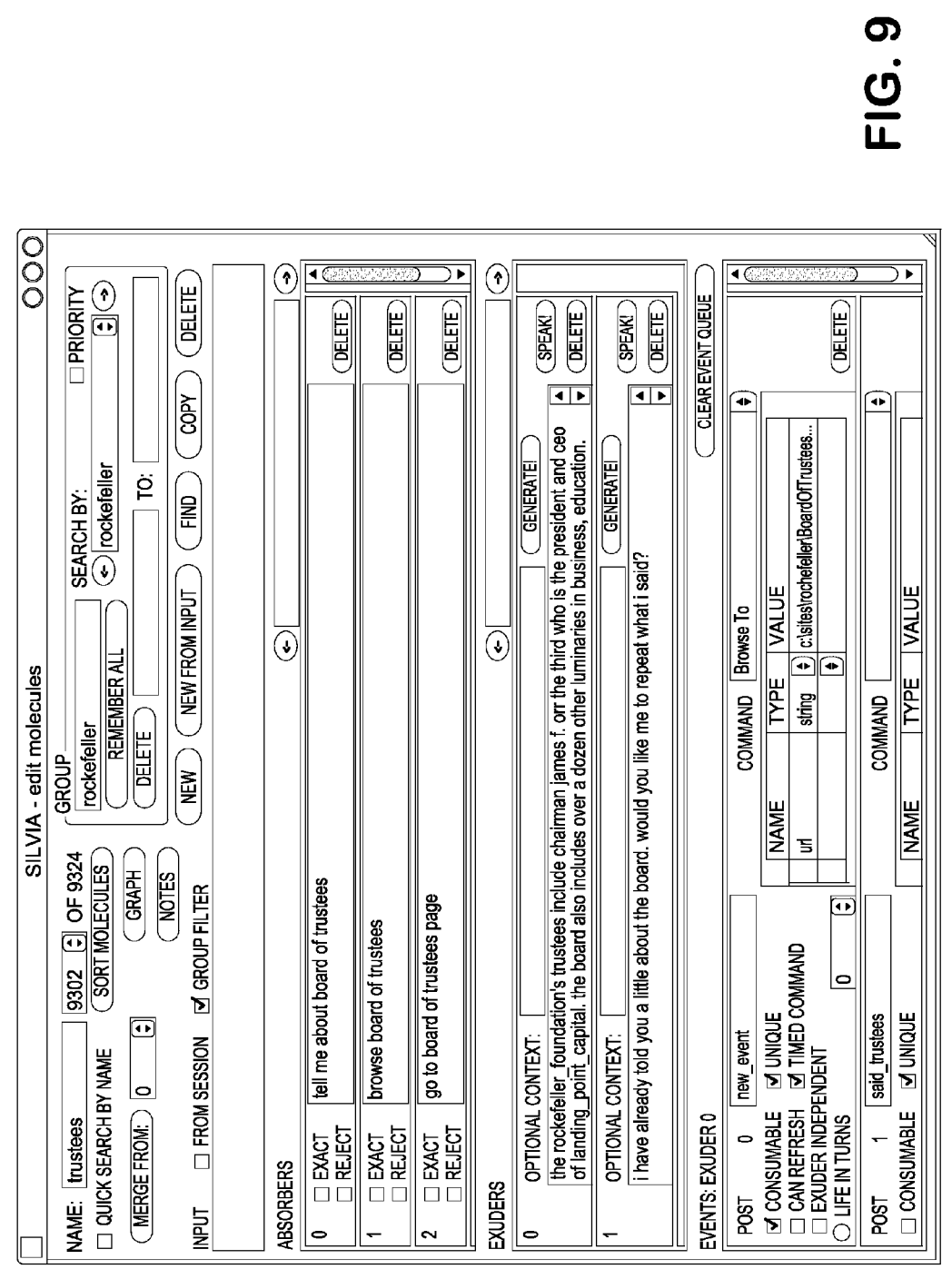

One embodiment of an interface which allows a user to train the system is shown in FIG. 9. The interface depicts molecules which are groupings of predetermined outputs and predetermined inputs based on a known data set. Molecules could be expanded to include variable data and can be generated in real time while the system is operating. In this example, the interface shows that the name of the molecule being edited is "trustees" which belongs to the group "rockefeller." The list of "absorbers" is a list of composite concepts that may match a user input. The list of "exuders" is a list of possible outputs that may be used when one of the above absorbers is picked as matching a user's input. Using this interface, a user may define absorbers and exuders and link them together. A user may also define an exuder as an action, such as loading a web page when a certain absorber closely matches a user input. In this example, if a user's input matches the absorber "go to board of trustees page," the related exuder will execute the event of loading the uniform resource locator that corresponds to the board of trustees page.

Figure 10:
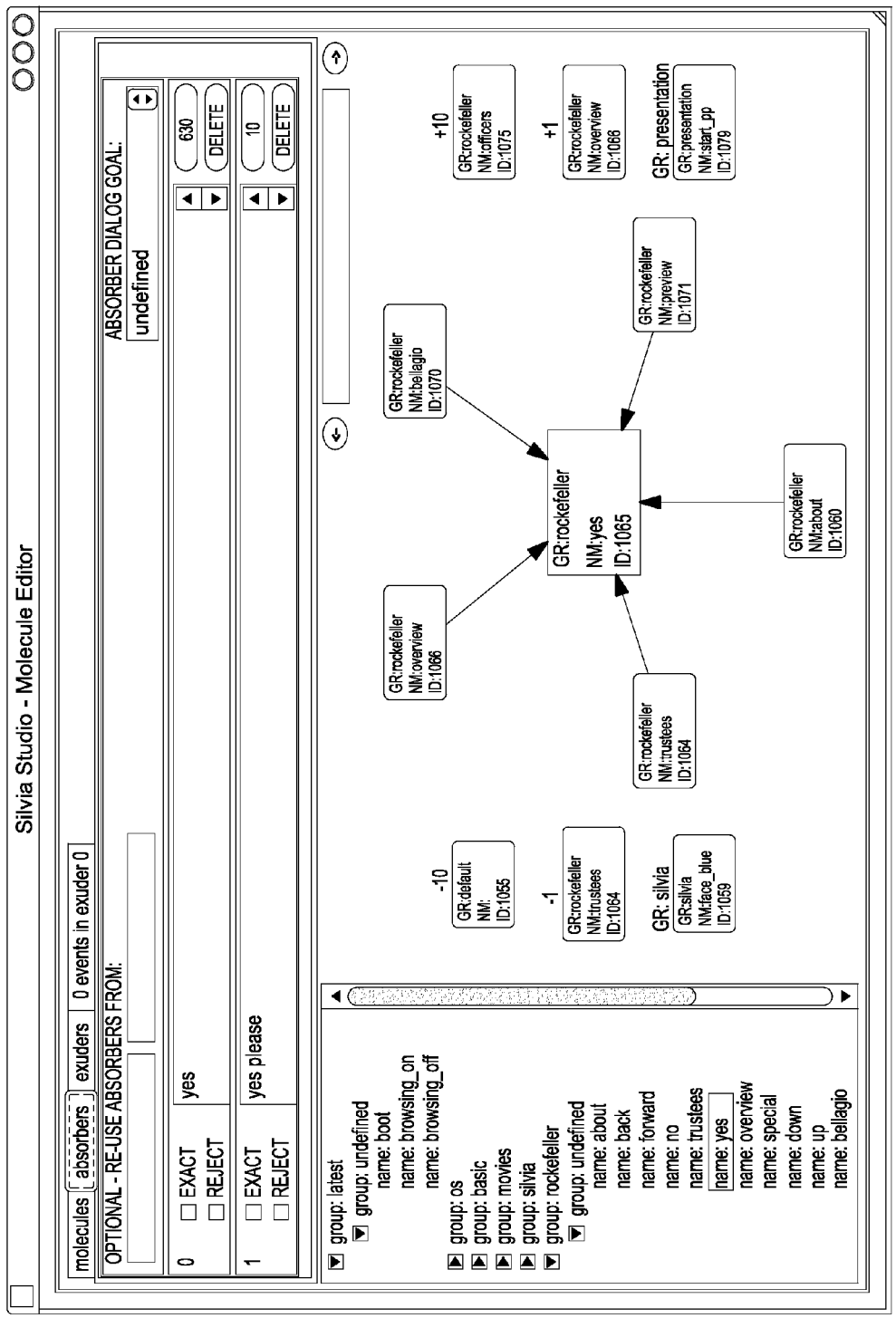
FIG. 10 depicts another embodiment of an interface that depicts the links between elements in the database.

Another example of a molecule editor is depicted in FIG. 10. The interface depicted in FIG. 10 allows a user to edit the relationships between a particular absorber and other absorbers. An absorber may also be added to another group.

When a new concept is created and added to the database, the weight of the concept may be calculated in one of the manners described herein or it may be assigned a default weight by the system. The default weight may be the average weight of the other concepts stored in the system. In one embodiment, a user may manually assign a weight to a new concept.

In another embodiment, weight is assigned to a new concept based on the context in which the new concept is received. The weight may be the average of the concepts surrounding the new concept.

The weights assigned to concepts in the database may be created in any of the methods described when a concept is first added to the database. Alternatively, the weights may be created when the concept is first added to the database and modified at periodic intervals, such as, for example, weekly, by the system. In another embodiment, the weights may be created upon the match of a concept with a token in the input array.

In one embodiment, after weights are assigned to tokens in the input array, elements with a weight below a predetermined threshold may be removed from the array or discarded. Alternatively, they may be ignored. An advantage of not discarding an element is in the event that there is a contextual override to the determined weighting. For example, if a normalized weight threshold is set at 0.5 each element with a weight of less than 0.5 will not be considered during further analysis.

The concept database may have multiple concepts for a single word. This occurs for words that are spelled the same way but have different meanings, such as "bear" or "ball." When the system receives input containing one of these terms, multiple matching concepts are identified and the system examines the context in which the term is used to determine which concept to utilize. The system may look at the other terms in the input or at other input arrays that were received, either recently or from the user currently utilizing the system, and compare them to statements stored in memory or an external source to determine which concept to use. For example, if the user says, "I would like to go play some ball" the system will look at other statements and find that when the word "ball" appears in the same statement as the word "play" the concept for "ball" will be used meaning the toy to be played with and not the event to be attended. Alternatively, the system may determine the correct concept on the one or more databases loaded into the system.

Different concepts in the concept database may be related to each other. For example, the concept "subway" may be related to the concept "train" because they represent similar ideas. The concept "dachshund" may be related to the concept "dog" because a dachshund is a type of dog. These relationships may be create by the user when a new concept is added to the system or they may be created by the system based on the context of the concept in stored databases or external sources. Relationships may also be obtained from a database such as a dictionary or thesaurus which are common on the Internet.

Figure 7:
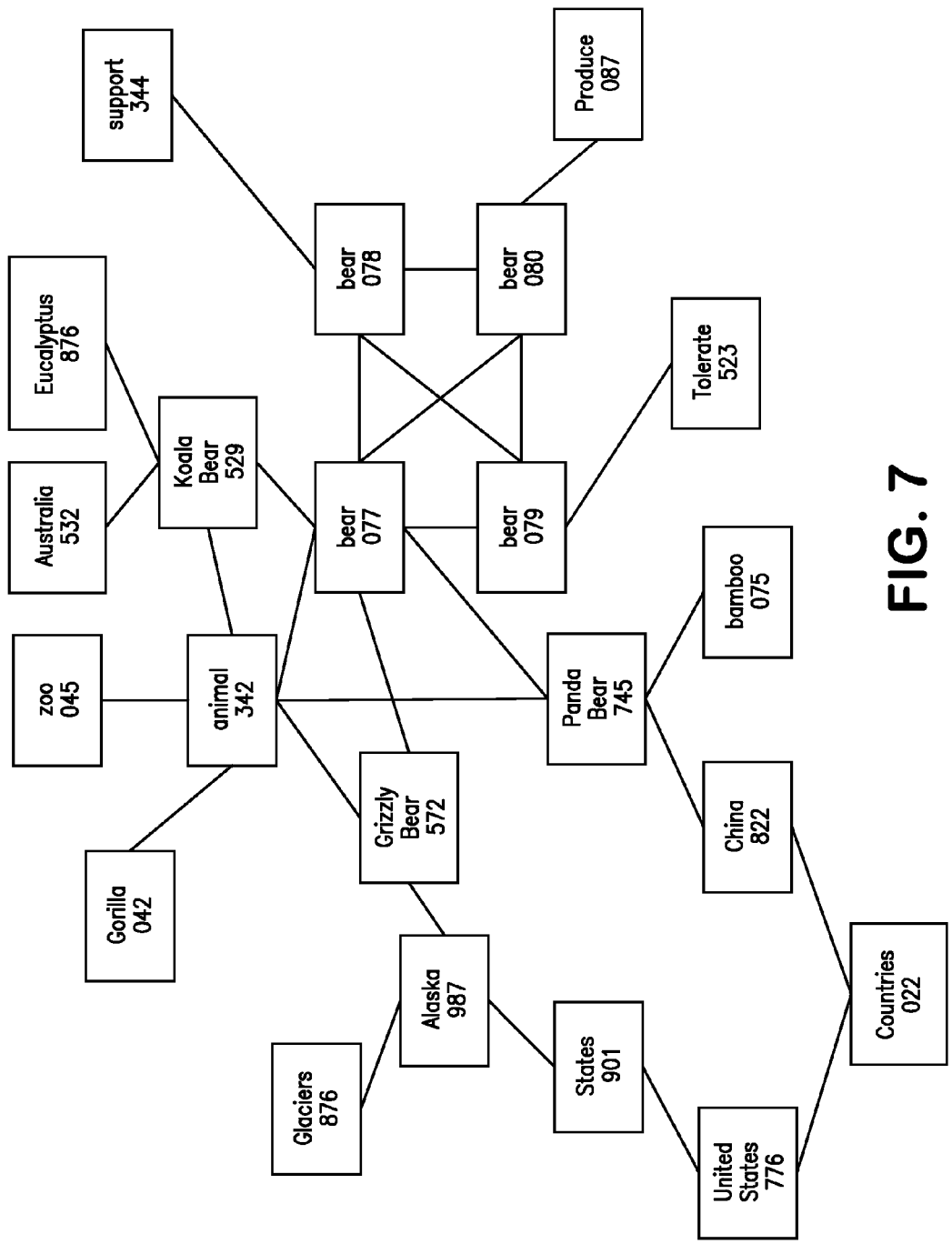
FIG. 7 is an example of an excerpt from a relationship database according to one embodiment of the present invention.

In one example, the system may receive the input statement, "I saw a bear at the zoo today." The system will immediately determine that the word "bear" has multiple meanings and is represented by a number of tokens. FIG. 7 is an example of an excerpt from a relationship database of tokens showing the relationships between the tokens. The word "bear" is represented by four different tokens having four different meanings and four different assigned integers. The different meanings are represented by relationships with other tokens in the database. In order to determine which token to add to the input array to represent the meaning the user intended, the system will analyze other tokens in the input statement to see if they are related to either of the tokens for the word "bear." In this example, the system will immediately recognize that the token "zoo" is related to the token "animal" which is related to the token "bear." The system will then proceed using the token representing the word "bear" meaning an animal. Of course, one skilled in the art will recognize that FIG. 7 represents only a very small portion of a database of relationships between tokens.

In one embodiment, the linear token array is expanded into a multi-dimensional token array based on the corresponding root token and expanded sets of arrays comprised of tokens derived from the root tokens. After the input array has been constructed and weights have been assigned to the tokens in the input array, the system according to the present invention compares the multi-dimensional array to a number of conceptual token arrays, which may be stored in a database. The comparison may be accomplished, for example, by regression analysis or some other statistical method or mathematical algorithm or method. The conceptual token arrays are input patterns which may be in sentence form. The conceptual token arrays are preferably stored in the same format as the linear input arrays such as, for example, integer format, to expedite comparison. The system then generates a value for each conceptual token array such as, for example, a probability value of a likely match based on the similarity between the conceptual token array and the multi-dimensional array. The values may be normalized for ease of comparison. The weights of the tokens in the multi-dimensional array may also be considered, for example, so that a higher value for a conceptual token array is generated if it matches the tokens in the multi-dimensional array with the highest weights. After the system has compared the multi-dimensional array to all of the conceptual token arrays stored in memory, the system generates a list of conceptual token arrays that have the highest value, and thus are the closest matches and are the most similar to the linear array.

In one embodiment, the conceptual token arrays are sentences or statements that are added to the system before the input is received such as, for example, as part of a training process.

In one embodiment, a system according to the present invention determines whether one or more tokens in the conceptual token array correlate to one or more predetermined criteria, such as for example, whether any two or more tokens in the conceptual token array comprise a composite concept. In one embodiment, if any two or more tokens are found to comprise a composite concept, they are replaced in the conceptual token array by a token representing the composite concept. In another embodiment, one or more tokens representing the composite concept may be added to the conceptual token array.

In one embodiment, each conceptual token array may be assigned a value such as, for example, the probability of a likely match based on its similarity to the input array after a comparison of the two, but the value may be incremented or decremented based on criteria such as, for example, context, prior input, active database or some other factor. In another embodiment, the value is a percentage based on the number of elements in the conceptual token array that match the elements in the input array. The conceptual token arrays that are analyzed may include both input and output conceptual token arrays.

Once the system has the list of conceptual token arrays that have the highest value and thus most closely match the input array, the system may select the conceptual token array with the highest value to represent the input. Alternatively, the system may examine past exchanges between the system and the user to determine the best conceptual token array to use based on the context of the past exchanges. This ensures for continuity of a conversation or transaction.

When the system has identified the conceptual token array that is the best match for the multi-dimensional array, the system can begin constructing an output. In one embodiment, the output construction begins by searching the input array for one or more tokens with a weight above a predetermined threshold. If such tokens exist, those tokens are tagged as "essential." The system will search a collection of output patterns for the essential tokens. The system then searches first for a match to a first essential token and its corresponding root tokens. The search can be accomplished for example, using statistical algorithms such as regression analysis, Hidden Markov Models, generic algorithms and modifications thereto. The system generates a multi-dimensional array based on the essential tokens, the root tokens from which the essential tokens are derived and tokens derived from the root tokens. For example, a variation to a Hidden Markov Model can be used where the algorithm is restarted for each essential token after a selection of output patterns has been achieved. If one or more output patterns exist with the essential token, these output patterns are compared to the conceptual token array which represents the input array. The system will generate a value based on the similarity between the conceptual token array and the output patterns. If the value representing the similarity between the conceptual token array and the output pattern is above a predetermined threshold, that output pattern is chosen to output to the user.

When the system has determined that there is no essential token, the system will search the output patterns stored by the system for an output pattern that closely resembles the conceptual token array that represents the input array. The output pattern that most closely resembles the conceptual token array is chosen for output. In some embodiments, each conceptual token array has a corresponding output pattern which obviates the need for this search.

The output patterns may be collections of tokens with assigned integers and weights which facilitates easy comparison with the conceptual token arrays. In some embodiments, the output patterns are complete statements that may be output to the user in their entirety. The output statements may also be actions to be taken by the system or a combination of the two. In one embodiment, the system comprises a screen with a moving image of a person on the screen that is coordinated with an audio output device. In this embodiment, the system appears to be a natural person whose lip movements and facial expressions are coordinated to the audio output.

In some embodiments, the output patterns are simply one or two tokens or words. When one of these output patterns is selected as output, the system will dynamically construct an output starting with the output pattern and resulting in a complete, grammatically correct, sentence.

In the dynamic output construction phase, a variation to a Hidden Markov Model (VHMM) algorithm is employed to construct an output sentence using an output pattern as a starting point. The VHMM algorithm starts with the output pattern and constructs a sentence around the incomplete output pattern by accessing a database of complete sentences—which may be the output pattern database or the Internet—and determining the best words to be added to the incomplete output pattern based on the words that most often occur next to each other in the database of complete sentences. In one embodiment, the system may access a collection of sentences on a network, such as the New York Times web site on the Internet.

Utilizing a VHMM algorithm to construct sentences is known in the art. Known systems start with a single word and determine what word most commonly occurs next to that word. The system continues, word by word, until a "stop" signal is reached. While an VHMM algorithm has often been used to construct sentences based on the probability that any one word will be found next to any other, the results are often nonsensical.

The problem with existing VHMM algorithms is that they analyze only one or two words to determine the next logical word. While one word may follow the next, the sentence as a whole usually makes little or no sense. A system according to the present invention utilizes a VHMM algorithm that is adjustable so that it takes into account a number of words in a sentence before determining the next logical word. The user may set the number of words that is taken into account before the next word is determined. For example, if the user sets the VHMM algorithm to take 5 words into account, the algorithm will analyze a sequence of up to five words, if available, to determine which word to place before and after the sequence. The higher the VHMM algorithm is set, the more rigid the algorithm will be in formulating a response.

During the dynamic construction of output, a "stop" signal is issued when a complete output statement has been constructed so that no further terms are added to the output statement. The system usually determines a "stop" signal if a word has a high probability of being the first word or the last word in a sentence, which signals that the system should not add any further words. For example, the word "I" is frequently used to start sentences, so if the system determines, based on the words currently in the sentence, that the word "I" has the highest probability of being the first word in the sentence—a higher probability than any other word—the output construction phase will cease in that direction.

Another variable which may be used in the output construction phase is the probability falloff value. When output is constructed, a number of different words may be considered by the VHMM algorithm as discussed above. However, the words or atoms considered when the next word is added may be assigned different weights and thus considered more strongly or less strongly depending on their distance from the word to be added. For example, if an output phrase currently consists of the words, "My cat is," all three words may be considered by the VHMM algorithm when selecting a word to add to the end of the sentence. But the word "My" may be given less weight than the word "cat" because it is further away from the word to be added. This is called the probability falloff value: the probability of considering a word when output is constructed "falls off" depending on its distance from the output to be constructed.

This value may be set by the user and represents the probability at which a word may be placed adjacent to another word or string. For example, if the incomplete sentence "My cat is" is being analyzed, and the system determines that 40% of the sentences in which that clause appears end in "brown", the user must have set the probability falloff to 40% or greater for the word "brown" to be considered acceptable. If the user sets the probability falloff very high, the resulting output sentences will likely be fairly common and not very random.

(Although the above example discusses the probabilities of words following other words, it is important to note that the system is working in integers at all times and deals only with integers that represent words, not the words themselves, which vastly improves the speed of the system.)

When an output array has been prepared through dynamic construction, a suitability check is initiated. The suitability check may be performed based on various factors, including, for example, based on the number of essential concepts that are included in the output array and/or based on the order of such essential concepts in the output array. This suitability check is rerun for each output array resulting from each pass through the output construction algorithm. This looping through the output construction algorithm and suitability check will result in the best match being selected for the output array. To the extent that a better match is identified as a result of the run through the output construction algorithm and suitability check, such output array will supplant the prior selected output array as the final output. Upon completion of the final run through the output construction algorithm and suitability check, the final selection of the output array will be determined.

When a output pattern or a dynamically constructed statement is selected for output, it may be compared to stored output patterns, stored conceptual token arrays, or statements in external databases to determine whether it is properly constructed. This ensures that it is grammatically correct. If the comparison shows that there are no statements with a similar construction, the statement will be discarded and another output pattern or dynamically constructed statement will be selected for output.

In one embodiment, the selected or constructed output is in the form of a linear output array. The linear output array consists of the tokens, or words, to be output to the user. Before the output array is actually sent to the user, the output array may then be expanded into a multi-dimensional array based on the tokens contained in the linear output array in the same fashion as the input linear token array is expanded: related root tokens and tokens derived from the root tokens may be added to the array. The array may then be reduced back to a linear output array for output to the user with some or all of the tokens being replaced by tokens from the multi-dimensional array. The tokens are selected from the multi-dimensional array based on the weights of the elements in the multi-dimensional array, the likelihood of a particular token being used in the same sentence of the other tokens in the array, or the previous usage of the tokens in current or prior interactions with the user. The tokens may also be selected from the mutli-dimensional array on a random basis in order to ensure that the output has a certain level of variation from the input. In this way, a different expression of a concept may be added to the output.

In one embodiment, the system determines whether one or more tokens in the input array correlate to one or more predetermined criteria, such as for example, whether any one or more tokens in the array comprise a term of art or if two or more tokens in the array comprise a composite concept, in the same way that composite concepts are found and replaced in the input array as described above.

In one embodiment, the present system may utilize variables in the output. The variables may be, for example, a result of input received by the system. In one example, if the system receives as input, "My name is Leslie," the system will store the term "Leslie" under a variable, such as "_name." The system may then use this variable when constructing output in the future, such as saying, "Here is the information you requested, Leslie." Variables may be embedded in output patterns, and output patterns having variables which contain a stored value may be given a higher weight than output patterns without variables.

In another embodiment, variables may be a result of processes performed by the system. For example, if a user asks the system a question, the system may perform real-time calculations to output a variable which responds to the user's inquiry.

The output patterns may also contain actions to be taken by the system, such as, for example, the execution of programming steps on a computer system.

Once an output array has been constructed or selected, it is converted from integer format into a natural language output. The natural language output may be output to the user in a number of formats, such as, for example, text, speech, or other methods. The output is preferably also stored in a log file which is accessible by the system. The log file may be used by the administrator of the system to review the system's functionality.

In one embodiment, when the multi-dimensional array is constructed, a first comparison between the multi-dimensional array and the output patterns is conducted which tags each output pattern with a tag showing whether that particular output pattern may be invoked further in the process or whether that output pattern will not be considered further. This first comparison is a method of efficiently eliminating output patterns that are completely unrelated to the multi-dimensional array and thus have no possible role to play in further processes. A second comparison may then be run which will store the output patterns with the highest probability of matching the multi-dimensional array in a table so that they may be further evaluated.

In one embodiment, the context of the different elements in the multi-dimensional array are considered when determining the probability that one or more of the output patterns will be used to formulate a response to the multi-dimensional array. Once an output pattern is selected, the context of the elements in that output pattern may be compared to the multi-dimensional array to determine whether the context is proper.

In one embodiment, a system according to the present invention may simulate a constant stream of thought. To accomplish this simulation, the system starts with an input, which may be the last output constructed or selected by the system or an output pattern selected at random. The input is broken into tokens, each of which is assigned a corresponding integer, as described above. The output pattern is typically stored in token format, but may be converted to token format if it is not already in token format. The tokens may be annotated to provide additional information to the system, such as which user the tokens came from or whether the tokens were obtained randomly from the system. The tokens are then used as input into the artificial intelligence system as if they were input from a user. Recent inputs and outputs to the system may also be considered by the system in constructing or selecting an output in order to provide output to a user that conforms to recent exchanges, with more weight being assigned to more recent exchanges. Analysis of recent inputs and outputs may also be used to eliminate redundancies in output to the user. In this embodiment, the system will produce an output without any additional input. The output may be generated at periodic intervals, such as every one minute that elapses without an input from the user. The system may also generate output periodically but determine whether to actually output it to the user only if the output tokens have a weight above a predetermined threshold.

In a further embodiment wherein the system simulates a constant stream of thought as discussed above, an input may be constructed from a recent series of inputs and outputs. The input may be simply a collection of the concepts from the recent inputs and outputs with the highest weights. Once the input is constructed, it is entered into the system as if it were received from a user and an output is constructed according to the system as described above.

The various processes and stored elements, such as concepts, output patterns, and other databases utilized by the system may be stored in a memory such as, for example, a random access memory in order to speed processing of the system. In other embodiments, these processes and elements may be stored on a hard disk drive, flash memory drive, read-only memory, or any other type of memory device depending on the needs of the user.

In one embodiment, the a system according to present invention is implemented on a personal computer which has a programming interface that allows a user to modify input patterns and output patterns individually if desired in order to create specific responses to specific expressions of a user or users. The user may link a specific input pattern to a specific output pattern or action so that the system will provide the same response or action to a particular input every time it is entered.

Because the present invention requires limited hardware to operate, it may be implemented inexpensively in portable devices, such as toys, cellular telephones, portable computers, and multimedia devices such as MP3 players. The processing algorithms require only a small amount of memory, which may be, for example, a random access memory or a read-only memory, and a portable device used to implement this system may access databases which are stored remotely. In one embodiment, the databases accessed by a device used to implement a system according to the present invention may be provided to a user through a subscription service, which may provide different databases to a user depending on the user's location and desired uses of the invention. For example, if the user is a traveler, the device may access local databases of information concerning hotels and restaurants in the city in which the user is located in order to provide this information to the user. In this embodiment, a plurality of users may access a single database which may be updated frequently. Alternatively, a device used to implement a system according to the present invention which stores databases may periodically access a remote database maintainer or provider to download updates to any stored databases. The downloads may occur through a personal computer connected to the Internet or wirelessly, through the Internet or directly. Alternatively, the updates may occur using a CD-ROM, DVD, flash memory, or other media sent to the user through the mail.

The algorithms used to implement a system according to the present invention may be encrypted with methods known in the art before being stored in a memory in order to prevent copying or reverse engineering. In one embodiment, the algorithms may be compressed and encrypted for further protection. A number of methods of digital rights management as known in the art may also be used to prevent copying of the algorithms used to implement the present invention.

In one embodiment, a system according to the present invention may be implemented on a computer that is accessible from other devices operated by users. In this embodiment, the user is provided with an interface to the system which can communicate with the system through a programming interface. In this embodiment, the user does not have to install any software to operate the invention and merely accesses the invention on the user's computer or portable device.

In one embodiment of the invention, the system may be programmed to respond only to statements or questions which start with a keyword. This embodiment may be useful if the invention is in the form of an interactive speaking computer. The system may be present in a room with many people talking but may not respond to each statement made by each person. Instead, the system will only input and respond to statements that start with the keyword, which may be the name of the system. In a further embodiment, the system may record all statements it hears but may only respond to statements that begin with the keyword. This embodiment may be useful because all of the recorded statements may provide a context for the system to formulate a response. For example, if the system records numerous statements about the game of football without responding and then records a statement that says, "[keyword] what do you like?" the system may respond by saying, "I also like football."

In an embodiment of the invention wherein the invention is implemented on hardware that includes one or more speakers as output devices, the system may generate output to the user in the form of a human voice. The user may choose the particular voice to be used with the invention and celebrity voices may be available for the user to select. For example, in an embodiment where the present invention is implemented in a vehicle, the user may select the voice of George Clooney to respond to the user's inquiries and assist the user in controlling the various systems of the vehicle.

In one embodiment, the present invention functions on more than one device. In this embodiment, the software and the database or databases used to operate the system may be distributed across multiple devices. The devices communicate with each other while the system is operational.

For example, the present invention may be implemented on a plurality of satellite devices that are in communication with a single base station. The algorithms that are used to operate the present invention may be stored on the base station or on any one of the satellite devices that includes a processor and a storage device. The databases of stored information used to operate the present invention may be stored on the base station or distributed across numerous satellite devices. The satellite devices may communicate with the base station in any manner, such as hard wire connection or wireless connection such as WiFi, BlueTooth, Infrared, RF, or other methods known in the art.

The base station in this embodiment may control the actions of the satellite devices. In this embodiment, the satellite devices may receive input from a source, transmit the input to the base station, and receive a command from the base station. The command may direct the satellite devices to execute a particular action or to send a particular signal. In this embodiment, a plurality of devices have the ability to receive input and respond to input without the necessity of having the entire software application and/or database installed on each satellite device. This embodiment also provides for coordination between the satellite devices. For example, the base station may direct two satellite devices to interact in a specific way or to execute coordinated actions. The base station may also direct one satellite device to respond to input received from another satellite device.

In this embodiment, one database may provide information for the invention to function on numerous satellite devices. Information that is learned from input received by any one of the satellite devices is stored in the database and thus all of the satellite devices benefit from the knowledge learned by any of the satellite devices.

In this embodiment, additional satellite devices may be added to the present invention and function using the same base station as existing satellite devices. The base station may detect the presence of additional satellite devices by sending out signals at timed intervals and evaluating any responses it receives to determine what satellite devices are in communication range and thus may be controlled by the base station. Each satellite device may have a unique identification number or set of stored information that it may transmit to a base station in order to inform the base station as to what the device is and what functionality the device is capable of performing. Alternatively, a satellite device may send a signal upon activation to search for base stations that it may function with.

In an embodiment where each satellite device has a storage area and stores a database of information, the database may be copied to the base station when the device communicates with the base station. In this embodiment, the base station may store all information from every satellite device it has ever communicated with.

The base station may be connected to a network such as the Internet. The base station may access updates to the database or to programming from the Internet. In one embodiment, the base station may access the Internet to obtain information concerning a particular satellite device, such as a satellite device that is detected by the base station for the first time. The base station may access information concerning the satellite devices such as the type of device, device specification information, device ID, and what functions the device is capable of performing.

In one embodiment, each satellite device is an autonomous instance of the present invention complete with the necessary algorithms, software, and database or databases to function independently. Each satellite device may interact with a base station, and receive commands from a base station, only in certain instances such as whenever a base station is present. In this embodiment, each device does not require a base station to function but may function with the base station when one is available or when a user specifies that the device is to function with a base station.

In one example of an implementation according to this embodiment, an entity may provide a base station to users and allow users to purchase different satellite devices to function with the base station. The satellite devices may be, for example, interactive toys such as dolls or action figures. The base station will be able to detect the presence of the dolls and issues commands to the dolls based on the number and type of dolls in communication with the base station. When a new doll is purchased by the user, it will have the immediate benefit of the data stored in the base station, e.g., as soon as the doll is taken home and activated it will know the user's name. The base station may access information about the particular doll from data stored on the doll or from information downloaded from a network, such as the Internet. The base station may then use this data to determine appropriate actions for the doll. For example, in an embodiment having the seven dwarves, a Happy Dwarf doll will be more active than a Sleepy Dwarf doll and a Bashful Dwarf doll may be directed to follow the nearest doll if another doll is present.

The base station may also download updated information from the Internet at periodic intervals to control the actions of the toys. For example, the toys may be directed to behave in conformity with the events of a television or computer show. After a show has transpired, a toy provider may send updated information to all base stations to direct how the toys should behave. If a spell is cast by a wizard on to a princess on the television show, the princess doll may be directed to remain dormant by the base station pursuant to updated information it obtained from the toy provider.

The base station may also interact with different types of satellite devices. In the above example where the base station controls a plurality of toys, the base station may also interact with other satellite devices such as, for example, cellular telephones, personal digital assistants, e-mail devices, or any other electronic device.

The base station may also communicate with other base stations, that may become active when a user or users change locations, such as, for example, a base station in a vehicle or a base station in a vacation home. Information may be shared between the base stations so that information gathered or learned by any base station is shared with all base stations in the system. Upon becoming active, a base station may contact another base station through a network such as the Internet to update the stored database on the base station. A particular base station may have a particular set of rules such as, for example, a base station in a vehicle limiting the amount of movement or sounds of toys to prevent distraction to the driver.

In one embodiment with multiple base stations, a user may carry a portable device, such as, for example, a key fob or RFID card, which will alert a base station that the user has entered the area controlled by that particular base station. The device portable device may contain information which uniquely identifies the user or provides the preferences of the particular user to each base station. The portable device may have a storage area that contains updates or modifications to databases that may be downloaded by other base stations.

In one example of this embodiment, a user may carry a key fob device which emits an RFID signal at periodic intervals. When a user enters a home, the fob may communicate with a base station located in the home which has been preprogrammed by the user to turn on the lights and the air conditioning when the user arrives. When the user crosses the threshold of the door to exit the building, the fob may send a signal to the base station to turn off the lights and air conditioning or shut down any electronic devices which are still functioning. As the user walks to a vehicle, a base station in the vehicle may detect the presence of the fob and turn the lights on in the vehicle in anticipation of the user entering the vehicle. Alternatively, the fob may not actively send out signals and a base station will send out signals to detect any fobs when a particular action has occurred, such as the lifting of a car door handle or the pressure on the welcome mat of a house.

More than one instance of the present invention may run on a single base station. For example, a single base station may be used to control a plurality of toys, but may also run software to control household devices such as televisions and stereos. Two or more instances of the software or two or more sessions using the same software may be maintained on the same base station to control these different devices. In some cases, the instances of software may communicate with each other. For example, if a user defines "homework time" to be between 5 pm and 6 pm, the base station may automatically turn off all toys and televisions to encourage children to work on their homework.

As these and other variations and combinations of the features discussed above can be utilized without departing from the present invention as defined by the claims, the foregoing description of the preferred embodiment should be taken by way of illustration rather than by way of limitation of the invention set forth in the claims.

The invention claimed is:

1. A method for a computer system to interpret an input from a user and generate a response to the user input, comprising:

receiving the user input;

converting the user input into a one-dimensional token array having at least one token, wherein each one-dimensional token corresponds to a portion of the user input;

generating a root token array, corresponding to the one-dimensional token array, having at least one root token, wherein each root token corresponds to a root from which one of the one-dimensional tokens is derived;

generating a multi-dimensional token array, based on the root token array, having a plurality of tokens, wherein each token corresponds to at least one root token; and determining a match between the multi-dimensional token array and the one-dimensional token array, wherein determination of the match comprises:
  traversing the multi-dimensional token array to identify a combination of tokens in the multi-dimensional token array, wherein the combination of tokens corresponds to a dimension of the multi-dimensional token array,
  comparing the combination of tokens corresponding to the dimension of the multi-dimensional token array to the tokens from the one-dimensional token array,
  determining a weighting for the combination of tokens,
  storing the weighting and an identification of the combination of tokens in a memory;
determining a plurality of possible responses to the user input; and
generating a response to the user input.

2. The method of claim 1 wherein the combination of tokens is a first combination of tokens and the dimension of the multi-dimensional token array is a first dimension, and further comprising:
  repeating the step of determining a match between the multi-dimensional token array and the one-dimensional token array to identify a second combination of tokens wherein the second combination of tokens corresponds to a second dimension of the multi-dimensional token array and to identify a second weighting,
  comparing the first weighting to the second weighting,
  if the second weighting is greater than the first weighting, storing the second weighting and an identification of the combination of tokens in a first location of the memory and the first weighting and an identification of the combination of tokens in a second location of memory, otherwise storing the second weighting and an identification of the combination of tokens in the second location of the memory and the first weighting and an identification of the combination of tokens in the first location of memory.

3. The method of claim 1 further comprising:
  identifying a first token from the multi-dimensional token array as data to be stored in memory for later use.

4. The method of claim 1 wherein determining a weighting for the combination of tokens includes determining a weighting of individual tokens and determining a weighting of the combination of tokens.

5. The method of claim 1 wherein determining a match between the multi-dimensional token array and the one-dimensional token array comprises determining a best match from a plurality of possible matches.

6. The method of claim 1 wherein a value of the weighting increases as the number of matches increases.

7. The method of claim 1 wherein the memory is at least one of a database and a memory stack.

8. The method of claim 7 wherein the first location of memory is a first location of the memory stack and the second location of memory is a second location of the memory stack, and wherein the first location of the memory stack is located above the second location of the memory stack.

9. The method of claim 7 wherein the stack is reordered based on variable data.

10. The method of claim 9 wherein variable data is contextual data.

11. The method of claim 7 wherein the memory stack is reordered based on predetermined data.

12. The method of claim 7 wherein the memory stack is reordered based on a combination of variable data and predetermined data.

13. The method of claim 9 wherein variable data is contextual data.

14. A method for a computer system to interpret an input from a user and generate a response, comprising:
  receiving the user input;
  converting the user input into a one-dimensional token array having at least one token, wherein each token corresponds to a portion of the user input;
  generating a root token array, corresponding to the one-dimensional token array, having at least one root token, wherein each root token corresponds to a root from which one of the one-dimensional tokens is derived;
  generating a multi-dimensional token array, based on the root token array, having a plurality of tokens, wherein each token corresponds to at least one root token; and
  determining a match between the multi-dimensional token array and a predetermined input pattern, wherein determination of the match comprises:
    traversing the multi-dimensional token array to identify a combination of tokens in the multi-dimensional token array, wherein the combination of tokens corresponds to a dimension of the multi-dimensional token array,
    comparing the combination of tokens corresponding to the dimension of the multi-dimensional token array to the tokens from the predetermined input pattern,
    determining a weighting for the combination of tokens,
    storing the weighting and an identification of the combination of tokens in a memory;
  determining a plurality of possible responses to the user input; and
  generating a response to the user input.

15. The method of claim 14 wherein the combination of tokens is a first combination of tokens, the dimension of the multi-dimensional token array is a first dimension, the predetermined input pattern is a first predetermined input pattern, the weighting is a first weighting, the memory is a first memory location, and further comprising:
  the step of determining a match between the multi-dimensional token array and a predetermined input pattern to identify a second combination of tokens wherein the second combination of tokens corresponds to a second dimension of the multi-dimensional token array, and to identify a second weighting,
  comparing the first weighting to the second weighting,
  if the second weighting is greater than the first weighting, storing the second weighting and an identification of the second combination of tokens in a first location of the memory and the first weighting and an identification of the first combination of tokens in a second location of memory, otherwise storing the second weighting and the identification of the second combination of tokens in the second location of the memory and the first weighting and the identification of the first combination of tokens in the first location of memory,
  repeating the steps of comparing the combination of tokens, determining a weighting, and storing the weighting and the identification of the combination of tokens using a second predetermined input pattern to determine a third weighting,
  comparing the third weighting to the greater of the first weighting and the second weighting,
  if the third weighting is greater than the first weighting and the second weighting, storing the third weighting and an identification of the combination of tokens in the first location of the memory; and wherein the response to the user input is generated using the combination of tokens located in the first location of the memory.

16. A computer program product used with a processor, the computer program product comprising:
a non-transitory computer usable medium having computer readable program code embodied therein that is used for interpreting an input from a user and generating a response, said computer readable program code including:
computer readable program code which, when executed, receives a user input;
computer readable program code which, when executed, converts the user input into an input array having a plurality of concepts;
computer readable program code which, when executed, determines if any of the plurality of concepts in the input array is derived from a root concept and if any of the plurality of concepts is derived from a root concept,
replaces each such derived concept with the corresponding root concept,
identifies one or more related concepts that relate to the root concept, and
generates a multi-dimensional array based on the input array that includes the one or more related concepts;
computer readable program code which, when executed, correlates a concept in the multi-dimensional array to a first element in a database, wherein the first element in the database includes a link to a second element in the database;
computer readable program code which, when executed, determines a plurality of possible responses to the user input based on the correlation of the multi-dimensional array and the database; and
computer readable program code which, when executed, generates a response to the user input.

17. A system for interpreting an input from a user and generating a response comprising:
an input device for receiving the input from the user;
a memory, the memory including a database;
a processor coupled to the input device and the memory, the processor adapted to:
convert the input into an input array having a plurality of concepts;
determine if any of the plurality of concepts in the input array is derived from a root concept and if any of the plurality of concepts is derived from a root concept:
replace each such derived concept with the corresponding root concept,
identify one or more related concepts that relate to the root concept, and
generate a multi-dimensional array based on the input array that includes the one or more related concepts;
correlate a concept in the multi-dimensional array to a first element in the database, wherein the first element in the database includes a link to a second element in the database;
determine a plurality of possible responses to the user input based on the correlation of the multi-dimensional array and the database; and
an output device adapted to communicate the response to the user.

18. The system of claim 17 wherein the input device is at least one of a microphone, keyboard, mouse, telephone line, data feed, or speaker.

19. The system of claim 17 wherein the output device is at least one of a telephone line, data feed, or graphical display.

20. The system of claim 17 wherein the processor is further adapted to allow a user to define input concepts, define concepts and define relations between concepts.

21. The system of claim 17 wherein the output device further comprises a speaker.

22. The system of claim 17 wherein the input device includes a speech recognition module.

23. The system of claim 17 wherein the output device includes a speech generation module.

24. The system of claim 17 implemented as a training program for training users.

25. The system of claim 17 implemented as an interface to a search engine.

26. The system of claim 17 wherein the processor is further adapted to allow a user to define input concepts, define concepts and define relations between concepts.

* * * * *